(12) United States Patent
Shin et al.

(10) Patent No.: US 12,047,985 B2
(45) Date of Patent: Jul. 23, 2024

(54) METHOD AND DEVICE FOR SUPPORTING SIDELINK DISCONTINUOUS RECEPTION IN WIRELESS COMMUNICATION SYSTEM

(71) Applicant: Samsung Electronics Co., Ltd., Gyeonggi-do (KR)

(72) Inventors: Cheolkyu Shin, Gyeonggi-do (KR); Hyunseok Ryu, Gyeonggi-do (KR); Youngbum Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 172 days.

(21) Appl. No.: 17/692,727

(22) Filed: Mar. 11, 2022

(65) Prior Publication Data

US 2022/0295514 A1 Sep. 15, 2022

(30) Foreign Application Priority Data

Mar. 12, 2021 (KR) .................. 10-2021-0033007
Apr. 1, 2021 (KR) .................. 10-2021-0043004

(51) Int. Cl.
*H04W 72/50* (2023.01)
*H04W 52/02* (2009.01)
*H04W 72/1263* (2023.01)
*H04W 76/28* (2018.01)

(52) U.S. Cl.
CPC ..... *H04W 72/535* (2023.01); *H04W 52/0216* (2013.01); *H04W 72/1263* (2013.01); *H04W 76/28* (2018.02)

(58) Field of Classification Search
CPC ........... H04W 72/535; H04W 72/1263; H04W 76/28; H04W 52/0216

USPC .......................................... 370/311
See application file for complete search history.

(56) References Cited

U.S. PATENT DOCUMENTS

| | | | |
|---|---|---|---|
| 11,647,540 B2 * | 5/2023 | Lee ................. | H04W 76/14 370/329 |
| 2022/0224497 A1 * | 7/2022 | Li ................. | H04W 74/0808 |
| 2022/0322486 A1 * | 10/2022 | Park ................. | H04W 76/14 |

FOREIGN PATENT DOCUMENTS

| | | |
|---|---|---|
| KR | 1020220011444 | 1/2022 |
| WO | WO 2020/192640 | 10/2020 |
| WO | WO 2021/029672 | 2/2021 |

OTHER PUBLICATIONS

R1-2101788 (Year: 2021).*
R1-2101663 (Year: 2021).*
R1-2100309 (Year: 2021).*
Fujitsu, "Considerations on Partial Sensing and DRX in NR V2X", R1-2101788, 3GPP TSG RAN WG1 Meeting #104-e, Jan. 25-Feb. 5, 2021, 23 pages.

(Continued)

*Primary Examiner* — Intekhaab A Siddiquee
(74) *Attorney, Agent, or Firm* — The Farrell Law Firm, P.C.

(57) ABSTRACT

Provided is a method and apparatus for transmitting sidelink data by a first user equipment (UE) in a wireless communication system supporting sidelink communication between the first UE and a second UE. The method includes identifying configuration information including information associated with discontinuous reception (DRX) for the sidelink communication, and in case that the second UE performs a DRX operation, transmitting the sidelink data to the second UE in a DRX active time, the DRX active time of the second UE being identified based on the configuration information.

14 Claims, 17 Drawing Sheets

(56) References Cited

OTHER PUBLICATIONS

LG Electronics, "Discussion on Resource Allocation for Power Saving", R1-2100517, 3GPP TSG RAN WG1 Meeting #104-e, Jan. 25-Feb. 5, 2021, 20 pages.
InterDigital Inc., "Procedures for Handling the DRX Configuration", R2-2100515, 3GPP RAN WG2 Meeting #113, Jan. 2021, 4 pages.
International Search Report dated Jun. 14, 2022 issued in counterpart application No. PCT/KR2022/003397, 7 pages.

* cited by examiner (a)

(b)

METHOD AND DEVICE FOR SUPPORTING SIDELINK DISCONTINUOUS RECEPTION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2021-0033007, filed on Mar. 12, 2021, and Korean Patent Application No. 10-2021-0043004, filed on Apr. 1, 2021, in the Korean Intellectual Property Office, the disclosure of each of which is incorporated herein by reference in their entireties.

BACKGROUND

1. Field

The disclosure relates generally to a wireless communication system, and more particularly, to a method and device for performing discontinuous reception (DRX) in a wireless communication system supporting side link communication.

2. Description of Related Art

In order to meet the demand for wireless data traffic soaring since the fourth generation (4G) communication system came to the market, there have been ongoing efforts to develop enhanced fifth generation (5G) communication systems or pre-5G communication systems. For the reasons, the 5G communication system or pre-5G communication system is called the beyond 4G network communication system or post long term evolution (LIE) system.

For higher data transmit rates, 5G communication systems are considered to be implemented on ultra-high frequency millimeter wave (mmWave) bands, such as, e.g., 60 gigahertz (GHz). To mitigate pathloss on the ultra-high frequency band and increase the reach of radio waves, the following techniques are taken into account for the 5G communication system, beamforming, massive multi-input multi-output (MIMO), full dimensional MIMO (FD-MIMO), array antenna, analog beamforming, and a large scale antenna.

Also being developed are various technologies for the 5G communication system to have an enhanced network, such as an evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other various schemes under development for the 5G system including, e.g., hybrid frequency shift keying (FSK) and quadrature amplitude modulation QAM (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the internet of Things (IoT) network by which information is communicated and processed between things or other distributed components. Another arising technology is the Internet of Everything (IoE), which is a combination of the big data processing technology and the IoT technology through, e.g., a connection with a cloud server.

To implement the IoT, technology elements, such as a sensing technology, wired/wireless communication and network infra, service interface technology, and a security technology, are required. There is recent ongoing research for inter-object connection technologies, such as the sensor network, machine-to-machine (M2M), or the machine-type communication (MTC).

In the IoT environment may be offered intelligent Internet Technology (IT) services that collect and analyze the data generated by the things connected with one another to create human life. The IoT may have various applications, such as the smart home, smart building, smart city, smart car or connected car, smart grid, healthcare, or smart appliance industry, or state-of-the-art medical services, through conversion or integration of existing information technology (IT) techniques and various industries.

Accordingly, various attempts are being made to apply the 5G communication system to IoT. For example, 5G communication technologies such as sensor networks, M2M, and MTC are implemented by techniques including beamforming, MIMO, and array antenna. Application of a cloud RAN as the big data processing technology described above may be considered to be an example of convergence between the 5G technology and the IoT technology.

A plurality of services may be provided to users in the 5G communication system, which requires a method for providing the services in the same time interval according to characteristics and a device using the method. Various services provided by 5G communication systems are being studied, such as a service to meet the requirements of low latency and high reliability. In particular, in the case of vehicle communication, unicast communication, groupcast (or multicast) communication, and broadcast communication between a user equipment (UE) and another UE are supported in the NR V2X system. Unlike LTE V2X, which aims to transmit and receive basic safety information necessary for vehicles to travel on the road, NR V2X aims to provide more advanced services, such as platooning, advanced driving, extended sensor, or remote driving. An example of sidelink communication supported by the 5G communication system is vehicle-to-everything (V2X) communication. Hereinafter, a V2X UE is an example of a UE performing sidelink communication for convenience of description, but the disclosure may also be applied to various types of sidelink communication and to V2X, communication.

SUMMARY

The disclosure has been made to address at least the above-mentioned problems and/or disadvantages and to provide at least the advantages described below.

Accordingly, an aspect of the disclosure is to provide a method and device for efficiently supporting DRX in a wireless communication system supporting sidelink communication.

Another aspect of the disclosure is to provide a method and device for efficiently performing a sensing operation when a DRX operation is performed in a wireless communication system supporting sidelink communication.

Another aspect of the disclosure is to provide a method and device for selecting a resource when a DRX operation is performed in a wireless communication system supporting sidelink communication.

Another aspect of the disclosure is to provide a method and device for efficiently selecting a resource while a vehicle terminal exchanges information with another vehicle terminal and a pedestrian portable terminal using a sidelink in a wireless communication system supporting sidelink communication.

Another aspect of the disclosure is to provide a procedure for sensing and selecting a resource when DRX is performed between terminals in sidelink communication. The disclosed method may be applied and effectively used to minimize the terminal's power consumption and enable sensing and resource selection to be performed in a context where a UE operates in DRX.

In accordance with an aspect of the disclosure, a method for transmitting sidelink data by a first UE, in a wireless communication system supporting sidelink communication between the first UE and a second UE includes identifying configuration information including information associated with discontinuous reception (DRX) for the sidelink communication, and transmitting, in case that the second UE performs a DRX operation, the sidelink data to the second UE in a DRX active time, the DRX active time of the second UE being identified based on the configuration information.

In accordance with an aspect of the disclosure, a first UE for transmitting sidelink data in a wireless communication system supporting sidelink communication between the first UE and a second UE includes a transceiver, and a processor configured to identify configuration information including information associated with DRX for the sidelink communication, and transmit, via the transceiver, in case that the second LIE performs a DRX operation, the sidelink data to the second UE in a DRX active time, the DRX active time of the second UE being identified based on the configuration information.

In accordance with an aspect of the disclosure, a method for receiving sidelink data by a second UE in a wireless communication system supporting sidelink communication between a first UE and the second UE includes identifying configuration information including information associated with DRX for the sidelink communication, and receiving, in case that the second UE performs a DRX operation, the sidelink data from the first UE in a DRX active time, the DRX active time of the second UE being identified based on the configuration information.

In accordance with an aspect of the disclosure, a second UE for receiving sidelink data in a wireless communication system supporting sidelink communication between a first UE and the second UE includes a transceiver, and a processor configured to identify configuration information including information associated with discontinuous reception (DRX) for the sidelink communication, and receive, in case that the second UE performs a DRX operation, the sidelink data frown the first UE in a DRX active time, the DRX active time of the second UE being identified based on the configuration information.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
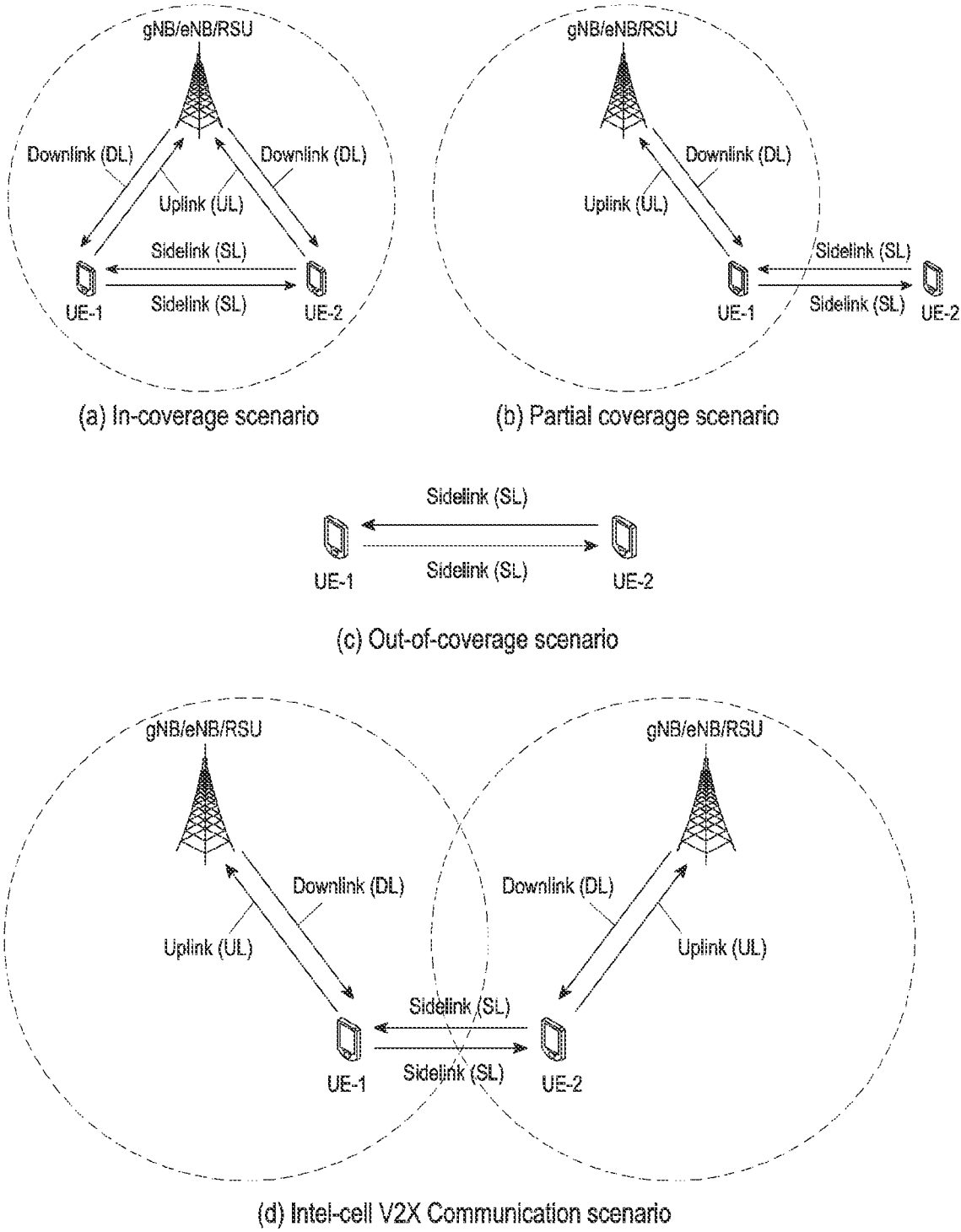
FIG. 1 illustrates a wireless communication system supporting sidelink communication according to an embodiment.

Hereinafter, embodiments of the disclosure are described in detail with reference to the accompanying drawings.

A description of technologies that are known in the art and are not directly related to the disclosure is omitted for the sake of clarity and conciseness.

Some elements may be exaggerated or schematically shown. The size of each element does not necessarily reflect the real size of the element. The same reference numeral may be used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of aspects of the disclosure.

As used herein, the term "unit" refers to a software element or a hardware element such as a field-programmable gate array (FPGA) or an application specific integrated circuit (ASIC). A unit plays a certain role but is not limited to a software or hardware element. A unit may be configured in a storage medium that may be addressed or configured to reproduce one or more processors. Accordingly, a unit includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub-units. An element or a unit may be implemented to reproduce one or more CPUs in a device or a security multimedia card. According to embodiments, a " . . . unit" may include one or more processors.

The description of embodiments of the disclosure focuses primarily on the RAN, new radio (NR), and the core network, packet core (5G system, or 5G core network, or NG core, or next generation core), which are specified by the 3rd generation partnership (3GPP) which is a mobile communication standardization organization. However, the subject matter of the disclosure, or slight changes thereto, may also be applicable to other communication systems that share similar technical backgrounds without departing from the scope of the disclosure, which would readily be appreciated by one of ordinary skill in the art.

In the 5G system, network data collection and analysis function (NWDAF) which is a network function for analyzing and providing the data collected from the 5G network may be defined to support network automation. The NWDAF may collect/store/analyze information from the 5G network and provide the result to an unspecified network function (NF). The analysis result may be used independently in each NF.

For ease of description, some of the terms or names defined in the 3GPP standards for 5G and NR LTE, or similar systems may be used. However, the disclosure is not limited by such terms and names and may be likewise applicable to systems conforming to other standards.

As used herein, terms for identifying access nodes, denoting network entities, denoting messages, denoting inter-network entity interfaces, and denoting various pieces of identification information are provided as examples for ease of description. Thus, the disclosure is not limited by the terms, and such terms may be replaced with other similar terms.

Herein, interfaces (uplink and downlink) between the base station and the UEs may be referred to as Uu interfaces, and a interface for the sidelink communication between the UEs may be referred to as a PC5 interface. Meanwhile, vehicles herein may include vehicles supporting vehicle-to-vehicular (V2V) communication, vehicles supporting vehicle-to-pedestrian (V2P) communication, vehicles supporting vehicle-to-network (V2N) communication, or vehicles supporting vehicle-to-infrastructure (V2I). UEs may include roadside units (RSUs) equipped with UE features, RSUs equipped with base station features, or RSUs equipped with some base station features and some UE features. The RSU(s) may be installed in various roadside facilities, such as traffic lights, tunnels, and intersections.

Herein, the base station may support both V2X communication and general cellular communication, or a base station supporting only V2X communication. In this case, the base station may be a 5G base station (gNB), a 4G base station (eNB), or an RSU. Accordingly, in this disclosure, base station may be referred to as an RSU.

Hereinafter, a V2X UE is exemplified as an example of a UE performing sidelink communication for convenience of description in the embodiments of the disclosure, but embodiments of the disclosure may be applied to various types of sidelink communication to which the disclosure is applicable, as well as to V2X communication.

In the sidelink communication, the UE may select a transmission resource for sidelink transmission through direct sensing. Here, sensing is an operation in which the UE monitors the sidelink channel, and may include monitoring/decoding of a physical sidelink control channel (PSCCH) and measurement of sidelink reference signal received power (SL-RSRP). In this case, various sensing and resource selection methods may be considered according to the state of the UE and the transmission environment. Specifically, the following resource selection modes/methods may be used.

full sensing
partial sensing
random selection

In the above methods, the full sensing is a method for performing sensing except for a slot in which the UE performs sidelink transmission in a section defined as a sensing window. In the case of full sensing, since continuous monitoring has to be performed in the section defined as the sensing window, there is a disadvantage in that the power consumption of the UE increases. This is described below with reference to FIG. 7. Accordingly, considering the low power consumption of the UE, the partial sensing and random selection may be considered. In the disclosure, for convenience of description, the partial sensing and random selection are named a power saving mode. In partial sensing, the slot for performing sensing is limited as compared to full sensing. As more detailed methods, periodic-based partial sensing and contiguous partial sensing may be considered. This is described below with reference to FIGS. 8 and 9. Further, the random selection is a method in which the UE randomly performs resource selection. Therefore, random selection requires no sensing operation. Even when random selection is performed, there may be a UE that cannot perform sensing due to power consumption and a UE that is capable of sensing. It is noted that a UE performing random selection may perform sensing if it is capable of sensing. The sensing in this case may be for performing reevaluation or preemption. As compared to full sensing, when partial sensing or random selection is performed, different sensing windows need to be set for reevaluation and preemption. This is described below with reference to FIG. 10.

In particular, DRX may be considered between UEs in sidelink communication. When DRX is applied in sidelink communication, it is possible to minimize power consumption of the UE, thereby increasing battery efficiency. Specifically, the power consumption by the UE may occur in the following process.

Decoding of control information $1^{st}$ SCI transmitted through PSCCH: As UE scheduling information is included in $1^{st}$ SCI, the corresponding information may be used to perform sensing by decoding $1^{st}$ SCI Decoding of control information $2^{nd}$ SCI transmitted through PSSCH: $2^{nd}$ SCI includes other control information which is not included in $1^{st}$ SCI Decoding of data transmitted through PSSCH In the sidelink communication, the transmission UE transmits sidelink control information (SCI) for scheduling sidelink data to the reception UE through the physical sidelink control channel (PSCCH) and transmits the sidelink data through the physical sidelink shared channel (PSSCH). Further, the SCI may also be transmitted through the PSSCH. The SCI may include at least one of resource allocation information used for transmission of the sidelink data, modulation and coding scheme (MCS) information applied to the sidelink data, group destination ID information, source ID information, unicast destination ID information, power control information of sidelink power control, timing advance (TA) information, DMRS configuration information for sidelink transmission, packet repetitive transmission-related information, and feedback information (A/N information) for sidelink data.

In a time period set as an inactive time as DRX is applied in sidelink communication, the UE may not perform decoding on the above-described control information and data information. In contrast, in a time period set as an active time as DRX is applied, the UE may perform decoding on the above-described control information and data information. Accordingly, a failure for the UE to perform channel sensing for resource selection may occur in the DRX inactive time period in sidelink communication. In the disclosure, an occasion where UE sensing and resource selection may be limited when DRX is performed in sidelink communication is described, and methods for addressing such an occasion and UE operations are proposed. FIG. 1 illustrates a wireless communication system supporting sidelink communication according to an embodiment.

Referring to FIG. 1, section (a) illustrates an example in which all V2X UEs UE-1 and UE-2 are positioned within the coverage of a base station (in-coverage, IC). All V2X UEs may receive data and control information through a downlink (DL) from the base station or transmit data and control information through an uplink (UL) to the base station. In this case, the data and control information may include data and control information for V2X communication. The data and control information may be for normal cellular communication, V2X UEs may transmit/receive data and control information for V2X communication through a sidelink (SL).

Section (b) of FIG. 1 illustrates an example in which UE-1 among V2X UEs is positioned within the coverage of the base station and UE-2 is positioned outside the coverage of the base station, or in other words, an example of partial coverage (partial coverage, PC) in which some V2X UE UE-2 is positioned outside the coverage of the base station. The V2X, UE UE-1 positioned within the coverage of the base station may receive data and control information from the base station through the downlink or transmit data and control information through the uplink to the base station. The V2X UE UE-2 positioned outside the coverage of the base station cannot receive data and control information through the downlink from the base station, and cannot transmit data and control information through the uplink to the base station. The V2X UE UE-2 may transmit/receive data and control information for V2X communication with the V2X UE UE-1 through a sidelink.

Section (c) of FIG. 1 illustrates an example in which all V2X UEs are positioned outside the coverage of the base station (out of coverage, OOC). Therefore, the V2X UEs UE-1 and UE-2 cannot receive data and control information from the base station through the downlink and cannot transmit data and control information through the uplink to the base station. The V2X UEs UE-1 and UE-2 may transmit/receive data and control information for V2X communication through a sidelink.

Section (d) of FIG. 1 illustrates an example of a scenario of performing V2X communication between V2X UEs UE-1 and UE-2 positioned in different cells. Specifically, section (d) of FIG. 1 illustrates an example in which V2X UEs UE-1 and UE-2 are connected to different base stations in a radio resource control (RRC) connected state or camp (RRC disconnected state, i.e., RRC idle state). In this case, V2X UE UE-1 may be a V2X transmission UE, and V2X UE UE-2 may be a V2X reception UE. Alternatively, V2X UE UE-1 may be a V2X reception UE, and V2X UE UE-2 may be a V2X transmission UE, V2X-UE UE-1 may receive a system information block (SIB) from a base station where it is connected (or camps), and V2X LTE UE-2 may receive an SIB from another base station where it is connected (or camps). In this case, as the SIB, an existing SIB or a SIB defined separately for V2X may be used, Information about the SIB received by V2X UE UE-1 and information about the SIB received by V2X UE UE-2 may be different from each other, Therefore, to perform V2X communication between the UEs UE-1 and UE-2 positioned in different cells, the information needs to be consistent, or a method for SIB information transmitted from the different cells may be necessary.

Figure 2:
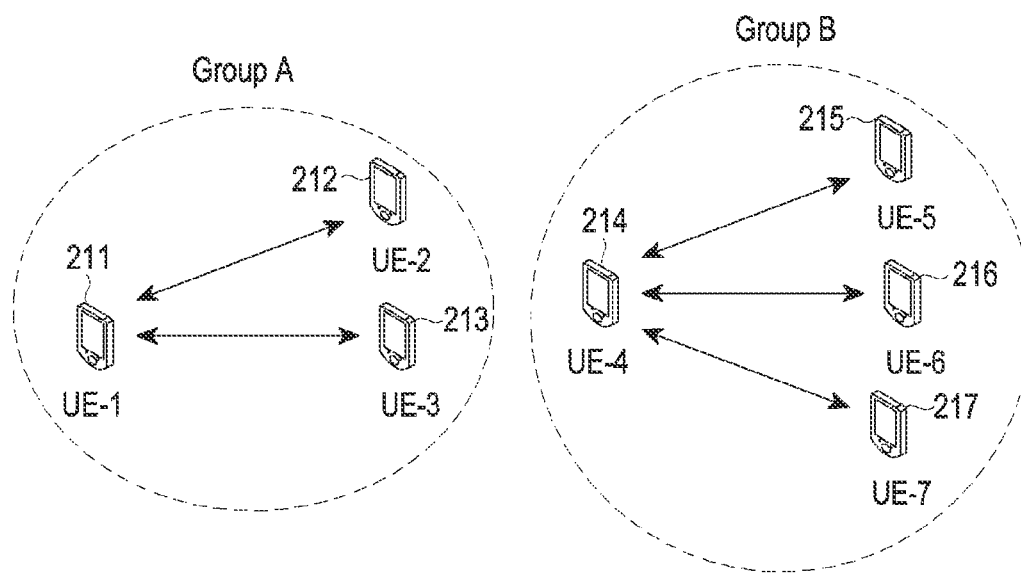
FIG. 2 illustrates an example of a V2X communication method using sidelink communication according to an embodiment.

FIG. 1 illustrates a V2X system composed of V2X UEs UE-1 and UE-2 for convenience of description, but communication may be performed between two or more V2X UEs, FIG. 2 illustrates an example of a V2X communication method using sidelink communication according to an embodiment.

Referring to section (a) of FIG. 2, UE-1 201 (e.g., a transmission (Tx) UE) and UE-2 202 (e.g., a reception (Rx) UE) may perform one-to-one communication, which may be referred to as unicast communication.

Referring to section (b) of FIG. 2, the Tx UE and the Rx UE may perform one-to-many communication, which may be referred to as groupcast or multicast. In section (b) of FIG. 2, UE-1 211, UE-2 212, and UE-3 213 form one group (Group A) to perform groupcast communication, UE-4 214, UE-5 215, UE-6 216, and UE-7 217 form another group (Group B) to perform groupcast communication. Each UE may perform groupcast communication only within the group to which it belongs. Communication between different groups may be achieved through to unicast, groupcast or broadcast communication. Although it is illustrated that two groups (Group A, Group B) are formed in section (b) of FIG. 2, the disclosure is not limited thereto.

V2X UEs in FIG. 2 may perform broadcast communication when all V2X UEs receive the data and control information transmitted by a V2X transmission UE through a sidelink. As an example, when it is assumed that UE-1 211 in section (b) of FIG. 2 is a Tx UE for broadcast, all UEs (UE-2 212, UE-3 213, UE-4 214, UE-5 215, UE-6 216, and UE-7 217) may receive the data and control information transmitted by UE-1 211.

An NR, V2X may consider support of a form in which a vehicle UE transmits data to only, one specific node through unicast and a form in which data is transmitted to a number of specific nodes through groupcast, unlike LTE V2X. For example, these unicast and groupcast techniques may be useful in service scenarios, such as platooning, which is a technique for connecting two or more vehicles via one network to allow these networks to travel in a group. Specifically, unicast communication may be required for the purpose of controlling one specific node by a leader node of a group for platooning, and group cast communication may be required for the purpose of simultaneously controlling a group consisting of a certain number of nodes.

Figure 3:
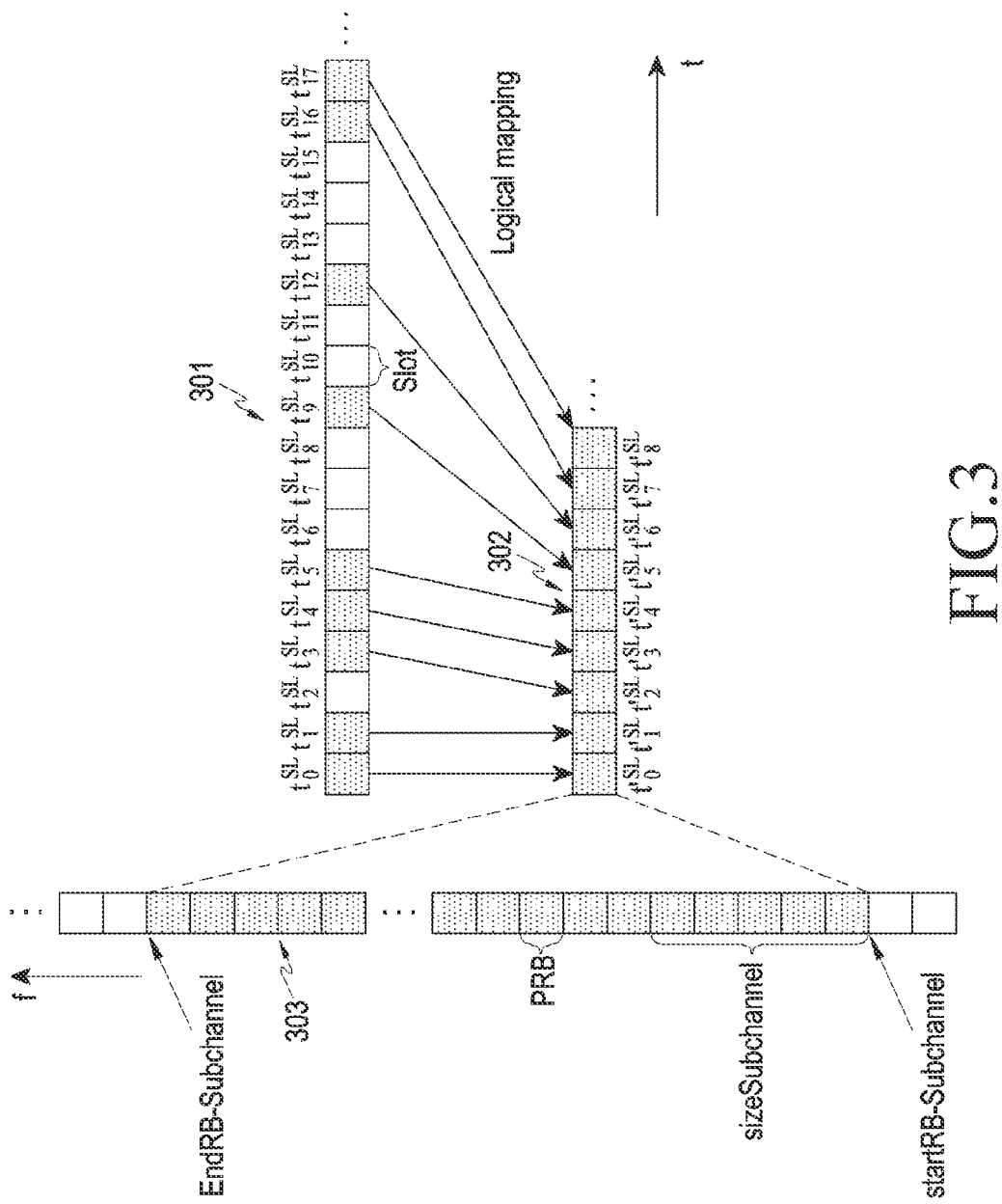
FIG. 3 illustrates a resource pool defined as a set of resources on the time and frequency used for transmission and reception in sidelink communication according to an embodiment.

FIG. 3 illustrates a resource pool defined as a set of resources on the time and frequency used for transmission and reception in sidelink communication according to an embodiment.

The resource granularity of the time axis/domain in the resource pool may be a slot. The resource granularity of the frequency axis/domain may be a subchannel composed of one or more physical resource blocks (PRBs). In the disclosure, an example in which the resource pool is non-contiguously allocated in the time domain is described, but the resource pool may be contiguously allocated in the time domain. Although an example in which the resource pool is contiguously allocated in the frequency domain is described herein, a method in which the resource pool is non-contiguously allocated in the frequency domain is not excluded.

Referring to FIG. 3, a case 301 in which the resource pool is non-contiguously allocated in the time domain is shown in the shaded areas. FIG. 3 illustrates when the resource granularity in the time domain is the slot. The sidelink slot may be defined within the slot used for uplink, Specifically, the length (e.g., number) of symbol(s) used as a sidelink in one slot may be set as sidelink bandwidth part (BWP) information. Therefore, among the slots used for the uplink, the slots in which the number of symbol(s) configured as the sidelink are not guaranteed cannot be the sidelink slots. As slots belonging to the resource pool, the slot in which the sidelink synchronization signal block (S-SSB) is transmitted is excluded. Referring to 301, except for such slots, a set of slots that may be used as a sidelink in the time domain is shown as $(t_0^{SL}, t_1^{SL}, t_2^{SL}, \ldots)$. The shaded portions in 301 indicate sidelink slots belonging to the resource, which may, be (pre-)configured with resource pool information through a bitmap.

Referring to 302, a set of sidelink slots belonging to the resource pool in the time domain is shown as $(t'_0{}^{SL}, t'_1{}^{SL}, t'_2{}^{SL}, \ldots)$. In the disclosure, (pre-)configuration indicates configuration information previously configured and stored in the UE or indicates when the UE is configured by the base station in a cell-common manner. Cell-common indicates that UEs in a cell receive configuration information about the same information from the base station. In this case, a method for obtaining cell-common information by receiving a sidelink system information block (SL-SIB) from the base station may be considered. Cell-common also indicates when the UE is configured in a UE-specific manner after an RRC connection with the base station is establish UE-specific may be replaced with the expression UE-dedicated, meaning that configuration information is received, as a specific value for each UE. In this case, a method for obtaining UE-specific information by receiving an RRC message from the base station may be considered. For (pre-)configuration, a method of configuration as resource pool information and a method for not being configured in the resource pool information may be considered. When (pre-)configured as resource pool information, all of the UEs operating in the corresponding resource pool may be operated with common configuration information except for when the UE is configured in a UE-specific manner after establishing an RRC connection with the base station. However, the method in which the (pre-)configuration is not configured in the resource pool information is basically a method in which the pre-configuration is independently configured from the resource pool configuration information. For example, one or more modes are (pre-)configured in the resource pool (e.g., A, B, and C), and an indication is made as to what mode of the modes (pre-) configured in the resource pool information is to be used by the (pre-)configured information independently from the resource pool configuration information.

Referring to 303 of FIG. 3, a case is shown in which the resource pool is contiguously allocated in the frequency domain. In the frequency axis, resource allocation may be set with SL BWP information and may be performed in units of subchannels. The subchannel may be defined as a resource granularity on frequency composed of one or more PRBs. For example, the subchannel may be defined as an integer multiple of the PRB. Referring to 303, the subchannel may be composed of five contiguous PRBs, and subchannel size (sizeSubchannel) may be the size of 5 contiguous PRBs. However, the content shown in the drawings is merely an example, and the size of the subchannel may be differently set. Although it is common that one subchannel is composed of continuous PRBs, it is not necessary for this to be composed of contiguous PRBs. The subchannel may be a basic unit of resource allocation for PSSCH. In 303, startRB-Subchannel may indicate the start position of the subchannel on frequency in the resource pool. When resource allocation is performed in units of subchannels on the frequency axis, resource on frequency may be allocated through configuration information, such as the resource block (RB) index where the subchannel starts (startRB-Subchannel), information about how many PRBs the subchannel is composed of (sizeSubchannel), and the total number of subchannels (numSubchannel). In this case, information about startRB-Subchannel, sizeSubchannel, and numSubchannel may be (pre-)configured as frequency resource pool information.

Figure 4:
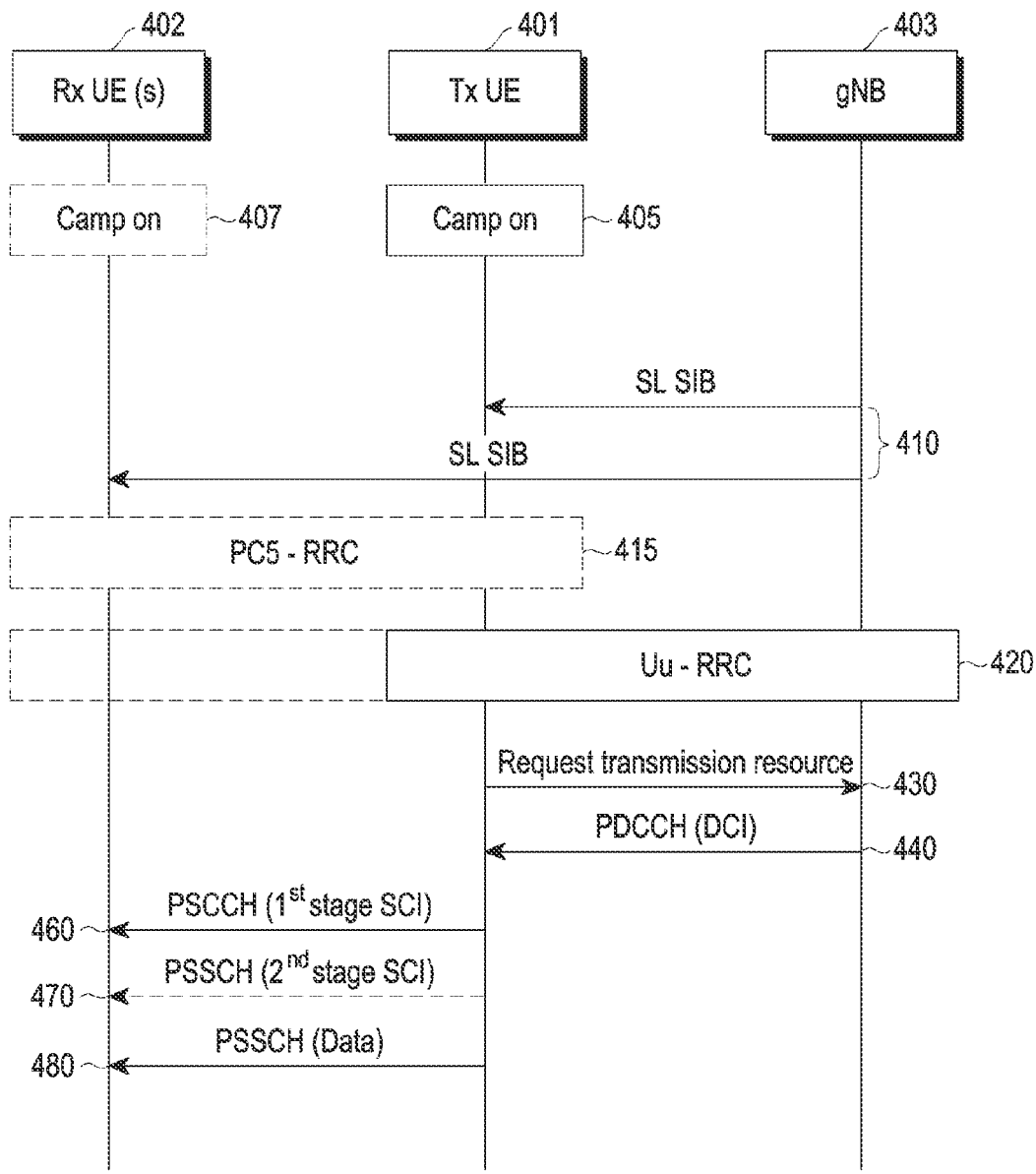
FIG. 4 illustrates a method for allocating a transmission resource by a base station in sidelink communication according to an embodiment.

FIG. 4 illustrates a method for allocating a transmission resource by a base station in sidelink communication according to an embodiment.

Hereinafter, a method for the base station to allocate transmission resources in sidelink communication will be referred to as Mode 1, which is a scheduled resource allocation. Mode 1 may indicate a method in which the base station allocates resources used for sidelink transmission to RRC-connected UEs in a dedicated scheduling scheme. The method for Mode 1 may be effective for interference management and resource pool management because the base station may manage sidelink communication resources.

Referring to FIG. 4, the Tx UE 401 may camp on the base station (gNB) 403 (405). Camp on indicates the UE in a standby state (RRC_IDLE) may select (or reselect) a base station (cell) as needed and receive system information or paging information, etc.

When the Rx UE 402 is positioned within the coverage of the base station (cell) 403, the reception UE 402 may camp on the base station (cell) 403 (407). In contrast, when the reception UE 402 is positioned outside the coverage of the base station (cell) 403, the reception UE 402 may not camp on the base station (cell) 403.

In the disclosure, the Rx UE 402 denotes a UE that receives data transmitted by the transmission UE 401.

The Tx UE 401 and the Rx UE 402 each may receive the SL-SIB from the base station 403 (410). The SL-SIB information may include sidelink resource pool information for transmission/reception in sidelink communication, parameter configuration information for sensing operation for resource selection, information for sidelink synchronization, or carrier information for sidelink transmission/reception operating in different frequencies. The Tx UE 401 and the Rx UE 402 may perform RRC configuration for sidelink communication through a PC5 RRC interface (415).

When data traffic for V2X communication is generated in the Tx UE 401, the Tx UE 401 may be RRC-connected to the base station 403 (420), which is referred to herein as a Uu-RRC connection. The Uu-RRC connection process 420 may be performed before data traffic generation of the Tx UE 401. In Mode 1, when the Uu-RRC connection process 420 between the base station 403 and the Rx UE 402 is performed, the Tx UE 401 may perform transmission to the Rx UE 402 through the sidelink. In contrast, in Mode 1, the Tx UE 401 may perform transmission to the Rx UE 402 through the sidelink even when the Uu-RRC connection process 420 is not performed between the base station 403 and the Rx UE 402.

The Tx UE 401 may send a request for a transmission resource capable of performing V2X communication with the Rx UE 402, to the base station (430), using an uplink physical uplink control channel (PUCCH), an RRC message or a medium access control (MAC) control element (CE). The MAC CE may be a buffer status report (BSR) MAC CE in a new format (including information about the size of the data buffered for device-to-device (D2D) communication and an indicator that it is a BSR for at least V2X communication). The Tx UE 401 may request a sidelink resource through a scheduling request (SR) bit transmitted through an uplink physical control channel (PUCCH). In Mode 1, the UE may additionally signal information that may assist the base station with scheduling, to the base station. This may be performed by an RRC message or MAC CE. In the disclosure, the method for indicating the corresponding information is not limited thereto. The corresponding information may be referred to as UEAssistanceInformation.

The base station 403 may allocate a V2X transmission resource to the Tx UE 401. In this case, the base station may allocate a transmission resource in a dynamic grant or configured grant scheme.

In the dynamic grant scheme, the base station may allocate a resource for TB transmission through downlink control information (DCI). As the sidelink scheduling information included in the DCI, there may be included parameters related to the transmission time of initial transmission and retransmission and frequency allocation position information field. DCI for the dynamic grant scheme may be a cyclic redundancy check (CRC) scrambled to sidelink vehicle radio network temporary identifier (SL-V-RNTI) to indicate the dynamic grant scheme.

In the configured grant scheme, the base station may periodically allocate resources for TB transmission by setting a semi-persistent scheduling (SPS) interval through Uu-RRC. In this case, the base station may allocate a resource for one TB through DCI, The sidelink scheduling information for one TB included in DCI may include parameters related to the transmission time of initial transmission and retransmission resource and the frequency allocation position information. When a resource is allocated in the configured grant scheme, the transmission time/occasion of initial transmission and retransmission and the frequency allocation position for one TB may be determined by the DCI and may be repeated at an SPS interval for the resource for the next TB.

DCI for the configured grant scheme may be CRC scrambled to SL-SPS-V-RNTI to indicate the configured grant scheme. Activation/retransmission/reactivation/release of SPS transmission in sidelink communication may be indicated to the UE through the PDCCH, and the SL-SPS-V-RNTI is an identifier for identifying the UE. The configured grant (CG) scheme may be divided into Type1 CG and Type2 CG. In the case of Type2 CG, it is possible to activate/deactivate a resource set as a grant configured through DCI.

Accordingly, in Mode 1, the base station 403 may instruct the Tx UE 401 to schedule sidelink communication with the Rx UE 402 through DCI transmission through the PDCCH (440).

Specifically, DCI format 3_0 or DCI format 3_1 may be DCI used by the base station 403 for sidelink communication to the Tx UE 401. DCI format 3_0 may be DCI for scheduling an NR sidelink in one cell, and DCI format 3_1 may be DCI for scheduling an LTE sidelink in one cell.

In the case of broadcast transmission, the Tx UE 401 may perform transmission without an RRC configuration 415 for the sidelink. In contrast, in the case of unicast or groupcast transmission, the Tx UE 401 may perform RRC connection with another UE on a one-to-one basis. As distinguished from Uu-RRC, the RRC connection between UEs may be referred to as PC5-RRC 415. In the case of groupcast, the PC5-RRC 415 may be individually connected between the UEs in the group. Although the connection of the PC5-RRC 415 is shown in FIG. 4 after the transmission 410 of the SL-SIB, this connection may be performed at any time before the transmission 410 of the SL-SIB or the SCI.

The Tx UE 401 may transmit an SCI ($1^{st}$ stage) to the Rx UE 402 through the PSCCH (460). The Tx UE 401 may transmit an SCI ($2^{nd}$ stage) to the Rx UE 402 through the PSSCH (470). In this case, information related to resource allocation may be included in the $1^{st}$ stage SCI, and other control information may be included in the $2^{nd}$ stage SCI. The Tx UE 401 may transmit data to the Rx LT. 402 through the PSSCH (480). In this case, the $1^{st}$ stage (SCI), $2^{nd}$ stage (SCI), and PSSCH may be transmitted together in the same slot. For the $1^{st}$ stage (SCI) transmitted in the PSCCH and the $2^{nd}$ stage (SCI) transmitted in the PSSCH, the NR standard, TS 38.212, may be referenced.

Figure 5:
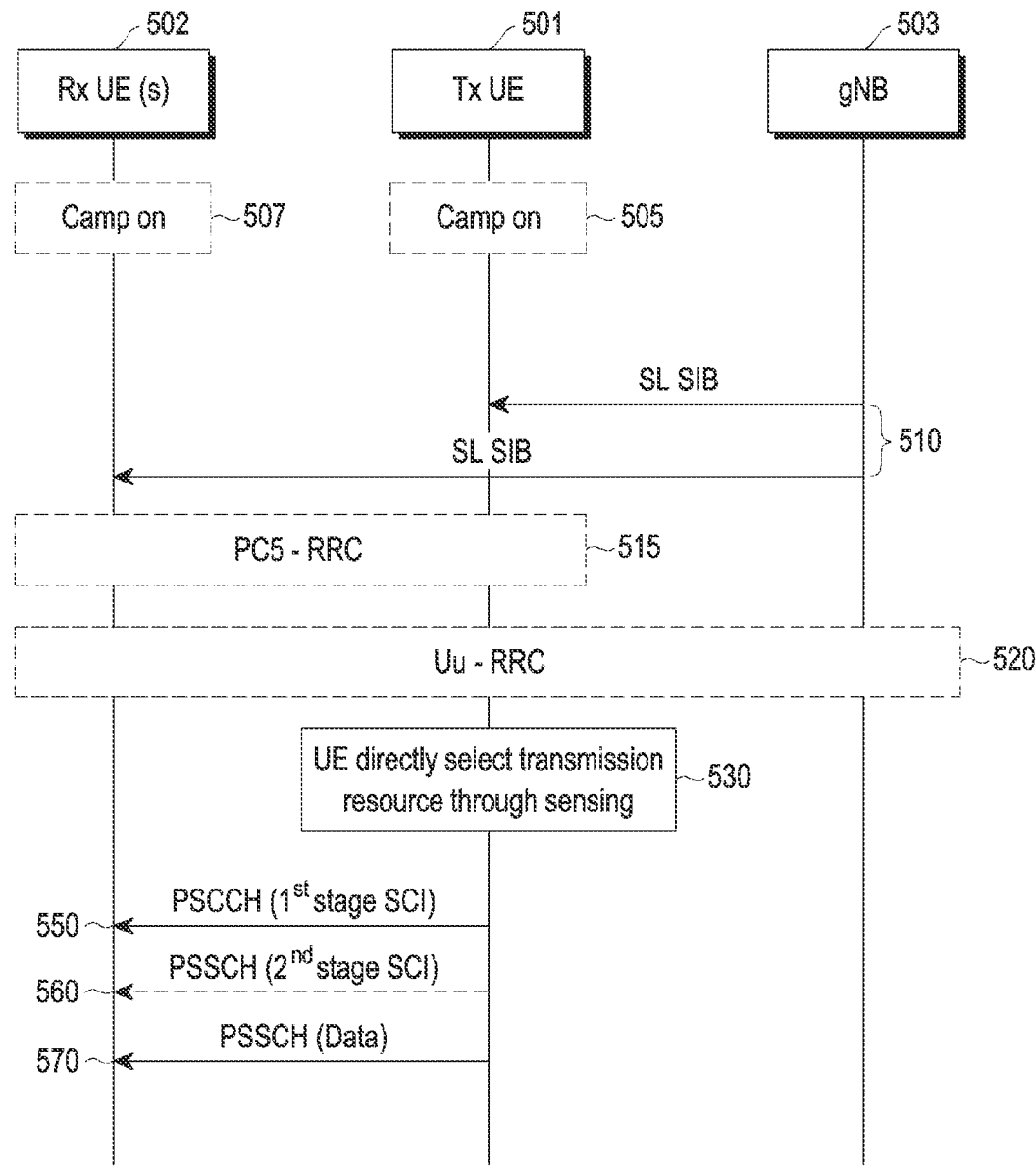
FIG. 5 illustrates a method for directly allocating/selecting a transmission resource of sidelink communication through sensing by a UE in sidelink communication according to an embodiment.

FIG. 5 illustrates a method for directly allocating/selecting a transmission resource of sidelink communication through sensing by a UE in sidelink communication according to an embodiment.

Hereinafter, the method in which a UE directly allocates/selects a transmission resource for sidelink communication through sensing in sidelink communication is referred to as Mode 2. The method for Mode 2 may be referred to as a method for UE autonomous resource selection. In Mode 2, the base station 503 may provide a transmission/reception resource pool for sidelink communication for V2X, as system information, and the Tx UE 501 may allocate/select a transmission resource according to a set rule/standard. Unlike Mode 1, in which the base station is directly involved in resource allocation, in Mode 2, the Tx UE 501 may autonomously/directly select a resource for sidelink communication based on a resource pool previously received through system information and transmit data.

Referring to FIG. 5, the Tx UE 501 may camp on the base station (cell) 503 (505). Camp on indicates when the UE in a standby state (RRC_IDLE) may select (or reselect) a base station. (cell) as needed and receive system information or paging information, etc. Referring to FIG. 5, unlike in FIG. 4 described above, in Mode 2, when the Tx UE 501 is positioned within the coverage of the base station (cell) 503, the Tx UE 501 may camp on the base station (cell) 503. In contrast, when the Tx UE 501 is positioned outside the coverage of the base station (cell) 503, the Tx UE 501 may not camp on the base station (cell) 503.

When the Rx UE 502 is positioned within the coverage of the base station (cell) 503, the Rx UE 502 may camp on the base station (cell) 503 (507), In contrast, when the Rx UE 502 is positioned outside the coverage of the base station (cell) 503, the Rx UE 502 may not camp on the base station (cell) 503.

The Tx UE 501 and the Rx UE 502 may receive an SL-SIB from the base station 503 (510). The SL-SIB information may include sidelink resource pool information for transmission/reception in sidelink communication, parameter configuration information for sensing operation, information for sidelink synchronization, or carrier information for sidelink transmission/reception operating in different frequencies. The Tx UE 501 and the Rx UE 502 may perform RRC configuration for sidelink communication through a PC5 interface (515).

The difference between the embodiment of FIG. 4 and the embodiment of FIG. 5 is that, in the embodiment of FIG. 4, the base station 403 and the UE 401 operate in an RRC connected state, whereas in the embodiment of FIG. 5, the UE 501 may operate even in the idle mode 520 (in an RRC disconnected state). Even in the RRC connected state 520, the base station 503 may enable the Tx UE 501 to autonomously/directly allocate/select a transmission resource without directly participating in resource allocation. The RRC connection between the UE 501 and the base station 503 may be referred to as a Uu-RRC 520. When data traffic for V2X communication is generated in the Tx UE 501, the Tx UE 501 may be configured with a resource pool through system information received from the base station 503, and the Tx UE 501 may directly allocate/select a time/frequency domain resource through sensing in the configured resource pool (530). When a resource is finally allocated/selected, the allocated/selected resource is determined as a grant for sidelink transmission.

In the case of broadcast transmission, the Tx UE 501 may perform transmission without the RRC configuration 515 for sidelink communication. In contrast, in the case of unicast or groupcast transmission, the Tx UE 501 may perform RRC connection with another UE on a one-to-one basis. As distinguished from Uu-RRC, the RRC connection between UEs may be referred to as PC5-RRC 515. In the case of groupcast, the PC5-RRC 515 may be individually connected between the LIES in the group. Referring to FIG. 5, although the connection of the PC5-RRC 515 is shown after the transmission 510 of the SL-SIB, this connection may be performed at any time before the transmission 510 of the SL-SIB or before the transmission of the SCI.

The Tx UE 501 may transmit an SCI ($1^{st}$ stage) to the Rx UE 502 through the PSCCH (550). The Tx UE 401 may transmit an SCI ($2^{nd}$ stage) to the Rx UE 402 through the PSSCH (560). In this case, information related to resource allocation may be included in the $1^{st}$ stage SCI, and other control information may be included in the $2^{nd}$ stage SCI. The Tx UE 501 may transmit data to the Rx UE 502 through the PSSCH (570). In this case, the $1^{st}$ stage (SCI), $2^{nd}$ stage (SCI), and PSSCH may be transmitted together in the same slot. For the $1^{st}$ stage (SCI) transmitted in the PSCCH and the $2^{nd}$ stage (SCI) transmitted in the PSSCH, the NR standard, TS 38,212, may be referenced.

As SCI used for the Tx UE 401 or 501 to communicate with the Rx UE 402 or 502 for to sidelink communication, there may be an SCI format 1-A as SCI ($1^{st}$ stage). There may also be SCI format 2-A or SCI format 2-B as SCI ($2^{nd}$ stage). In SCI stage), SCI format 2-A may include information for PSSCH decoding and be used when hybrid automatic repeat request (HARQ) feedback is not used or when HARQ feedback is used and includes all of ACK or NACK information. In contrast, SCI format 2-B may include information for PSSCH decoding and be used when HARQ feedback is not used or when HARQ feedback is used and includes only NACK information. For example, SCI format 2-B may be used only for groupcast transmission.

Figure 6:
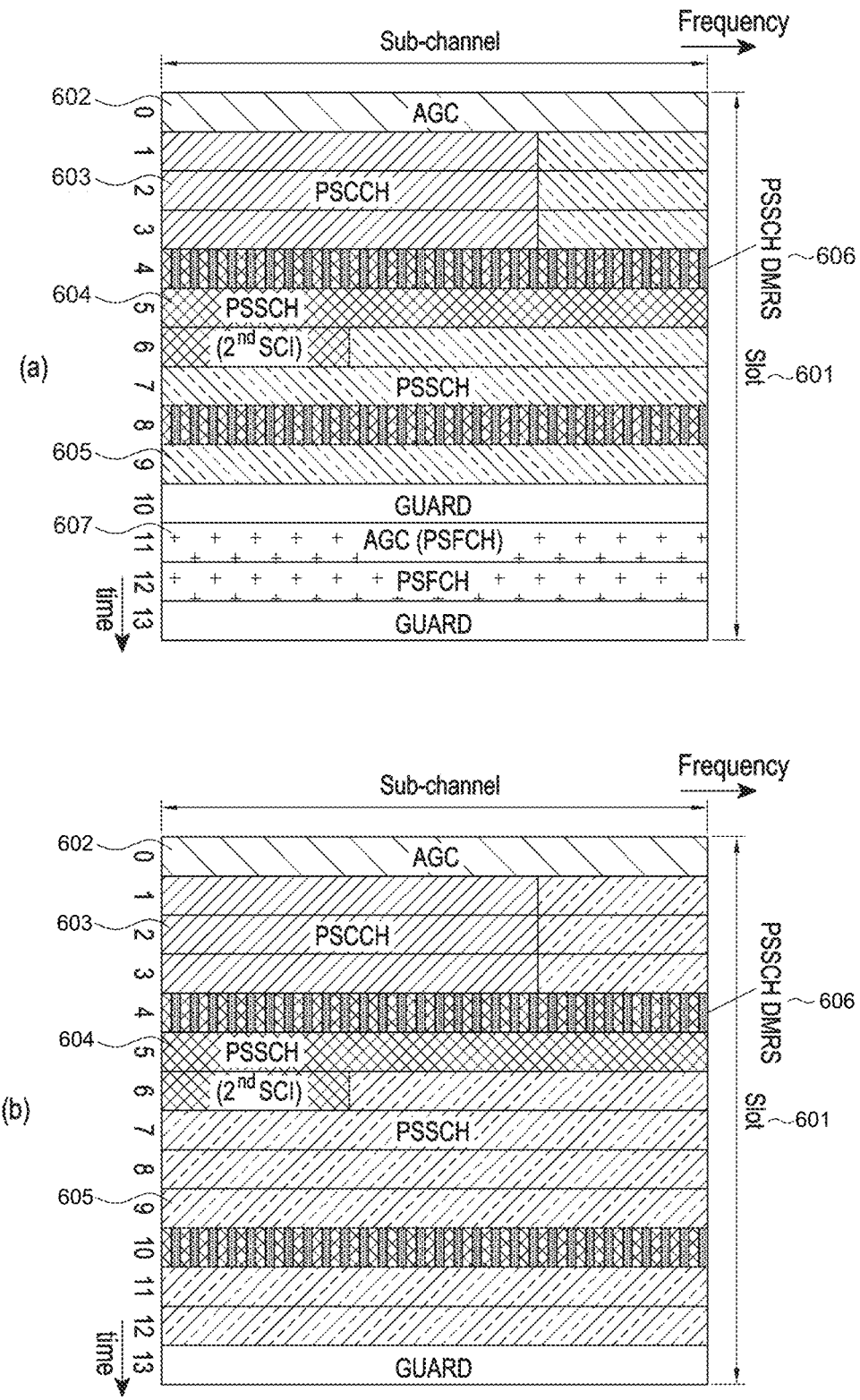
FIG. 6 illustrates an example of a mapping structure of physical channels mapped in one slot in sidelink communication according to an embodiment.

FIG. 6 illustrates an example of a mapping structure of physical channels mapped in one slot in sidelink communication according to an embodiment.

Specifically, a mapping for a PSCCH, PSSCH, and physical sidelink feedback channel (PSFCH) is shown in FIG. 6. In the case of the PSFCH, when the HARQ feedback of sidelink is activated in the higher layer, the temporal resource of the PSFCH may be (pre-)configured as resource pool information. The physical sidelink feedback channel (PSFCH) is a channel carrying sidelink feedback control information (SFCI). For example, in sidelink communication, the Rx LE may transmit an ACK or NACK as a signal responsive to the sidelink data, which the Rx UE has received, to the Tx UE. The SFCI may include such ACK/NACK information.

The resource in the time domain in which information is transmitted in the PSFCH may be (pre-)configured as one value among every 0, 1, 2, and 4 slots, '0' indicates that the PSFCH resource is not used. 1, 2, and 4 indicate that PSFCH resource is configured every 1, 2, and 4 slots. Section (a) in FIG. 6 illustrates a structure of a slot in which a PSFCH resource is not configured, and section (b) in FIG. 6 illustrates an example of a structure of a slot in which a PSFCH resource is configured.

The PSCCH/PSSCH/PSFCH may be allocated to one or more subchannels in the frequency domain. Subchannel allocation has been described in detail above in connection with FIG. 3. Referring to FIG. 6, mapping of the PSCCH/PSSCH/PSFCH in the time domain is described. One or more symbols may be used as a region 602 for automatic gain control (AGC) before the Tx UE transmits the PSCCH/PSSCH/PSFCH in the corresponding slot 601. Since the Rx UE transmitting information in the PSFCH may be positioned adjacent to or far away from the Tx UE receiving information in the PSFCH, information through the PSFCH may be received by the Tx UE with high or low reception power. Accordingly, the Tx UE may set an AGC range to receive information in the PSFCH with appropriate power. When the corresponding symbol(s) are used for the AGC, a method for repeating the signal of another channel in the corresponding symbol region and transmitting the signal may be considered. In this case, the repeated signal of the other channel may be PSCCH symbols or some of the PSSCH symbols. In contrast, a preamble may be transmitted in the AGC region, which may advantageously further shorten the AGC execution time than the method of repeatedly transmitting the signal of another channel. When a preamble signal is transmitted for AGC, a specific sequence may be used as the preamble signal 602. In this case, as the preamble, a sequence PSSCH DMRS, PSCCH DMRS, or channel state information-reference signal (CSI-RS), may be used. Herein, the sequence used as the preamble is not limited to the above-described examples. Additionally, according to FIG. 6, control information related to resource allocation in the early symbols of the slot may be transmitted in the PSCCH 603 as $1^{st}$ stage SCI, and other control information may be transmitted in region 604 of the PSSCH as $2^{nd}$ stage SCI.

Data scheduled by the control information may be transmitted in the PSSCH 605. In this case, the position in the time domain in which the $2^{nd}$ stage SCI is transmitted may be mapped from the symbol in which the first PSSCH DMRS 606 is transmitted. A position in the time domain in which the PSSCH DMRS 606 is transmitted may differ in a slot in which the PSFCH is transmitted and a slot in which the PSFCH is not transmitted, as shown in sections (a) and (b) of FIG. 6. The example of section (a) of FIG. 6 illustrates that the PSFCH 607, which is a physical channel for transmitting the feedback control information, is positioned in the end of the slot. By securing a predetermined empty time (guard) between the PSSCH 605 and the PSFCH 607 it is possible to allow the UE that has transmitted/received the PSSCH 605 to prepare to transmit or receive the PSFCH 607. After transmission and reception of the PSFCH 607, a predetermined empty period (guard) may be secured.

Figure 7:
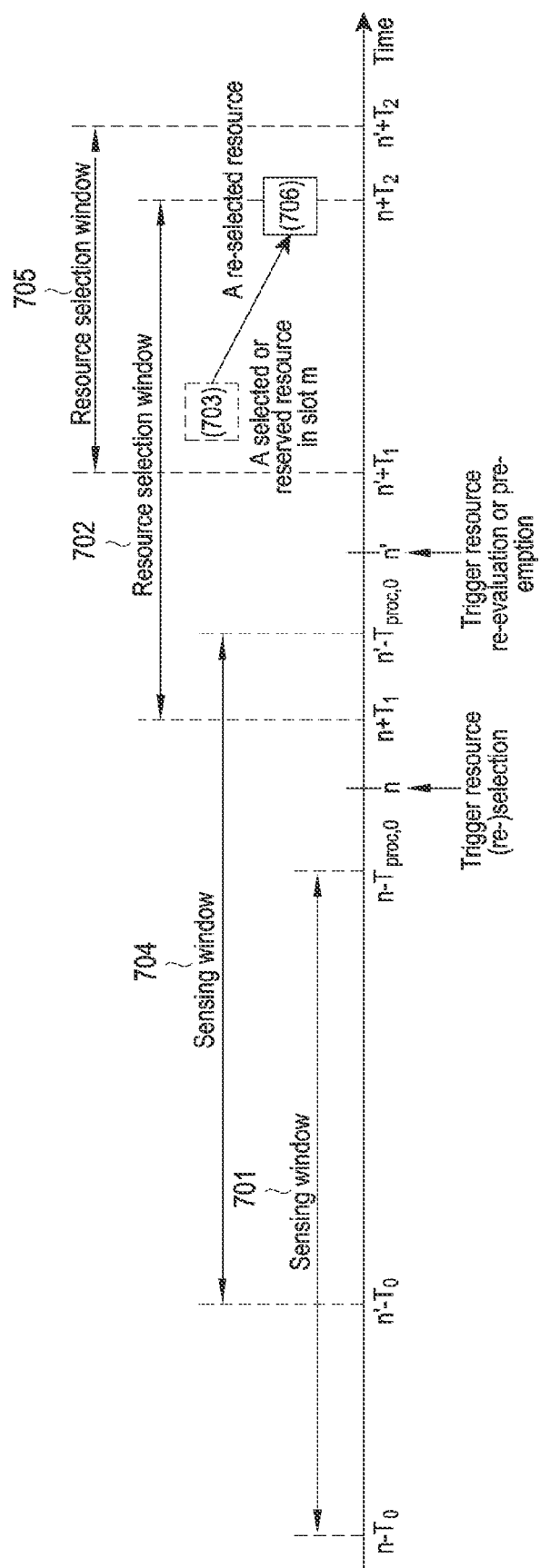
FIG. 7 illustrates a sensing window and a resource selection window necessary for a UE to perform resource (re)selection and reevaluation for resource allocation/selection in sidelink communication when the UE operates in full sensing according to an embodiment.

FIG. 7 illustrates a sensing window and a resource selection window necessary for a UE to perform resource (re) selection and reevaluation for resource allocation/selection in sidelink communication when the UE operates in full sensing according to an embodiment.

Referring to FIG. 7, when triggering for resource (re) selection is made at time n, the sensing window 701 may be defined as a time period $[n-T_0, n-T_{proc,0}]$. $T_0$ may be the start time of the sensing window and may be (pre-)configured with resource pool information. $T_0$ may be defined as a positive integer in milliseconds (ms) and is not limited to a specific value. $T_{proc,0}$ may be defined as the time required to process the sensed result and is not limited to a specific value. For example, $T_{proc,0}$ may be defined as a positive integer in ms or as a slot unit.

When triggering for resource (re)selection is made at time n, the resource selection window 702 may be determined as $[n+T_1, n+T_2]$. $T_1$ is a slot unit value and may be selected as UE implementation for $T_1 \leq T_{proc,1}$. $T_{proc,1}$ may be defined as the maximum reference value considering the processing time required to select a resource. For example, $T_{proc,1}$ may be defined as a different slot unit value depending on subcarrier spacing (SCS) and is not limited to a specific value. $T_2$ is a slot unit value and may be selected by the UE within a range meeting $T_{2min} \leq T_2 \leq$ remaining packet delay budget (PDB). $T_{2min}$ is for preventing the UE from selecting too low of a value as $T_2$ and may be set as '$T_{2min}(prio_{TX})$' by a higher layer depending on the Tx UE's priority ($prio_{TX}$) and SCS. The UE may select a transmission resource in the resource selection window 702.

FIG. 7 illustrates an example in which triggering for resource (re-)selection is made at time n and, even after time n, the UE continuously performs sensing so that triggering for reevaluation and preemption is performed at n' (n'>n). Specifically, when the UE determines that the resource selected by continuously performing sensing after a transmission resource is selected as triggering for resource (re) selection is made at time n is inappropriate for transmission, reevaluation may be triggered at time n' (n'>n). Continuous sensing by the UE may be performed in a manner of configuring multiple sensing windows in parallel or sequentially. Preemption for resource change (reselection) may be triggered at time n' (n'>n) when the resource reserved by the UE overlaps a resource reserved by another UE, and the resource reserved by the other UE has higher priority and interference with the corresponding resource is measured high. In such a case, the resource 703 selected and reserved by the resource (re)selection at time n may be changed (706) to another resource. FIG. 7 illustrates the sensing window 704 and the resource selection window 705 together for time n' (n'>n) when reevaluation and preemption are triggered.

Figure 8:
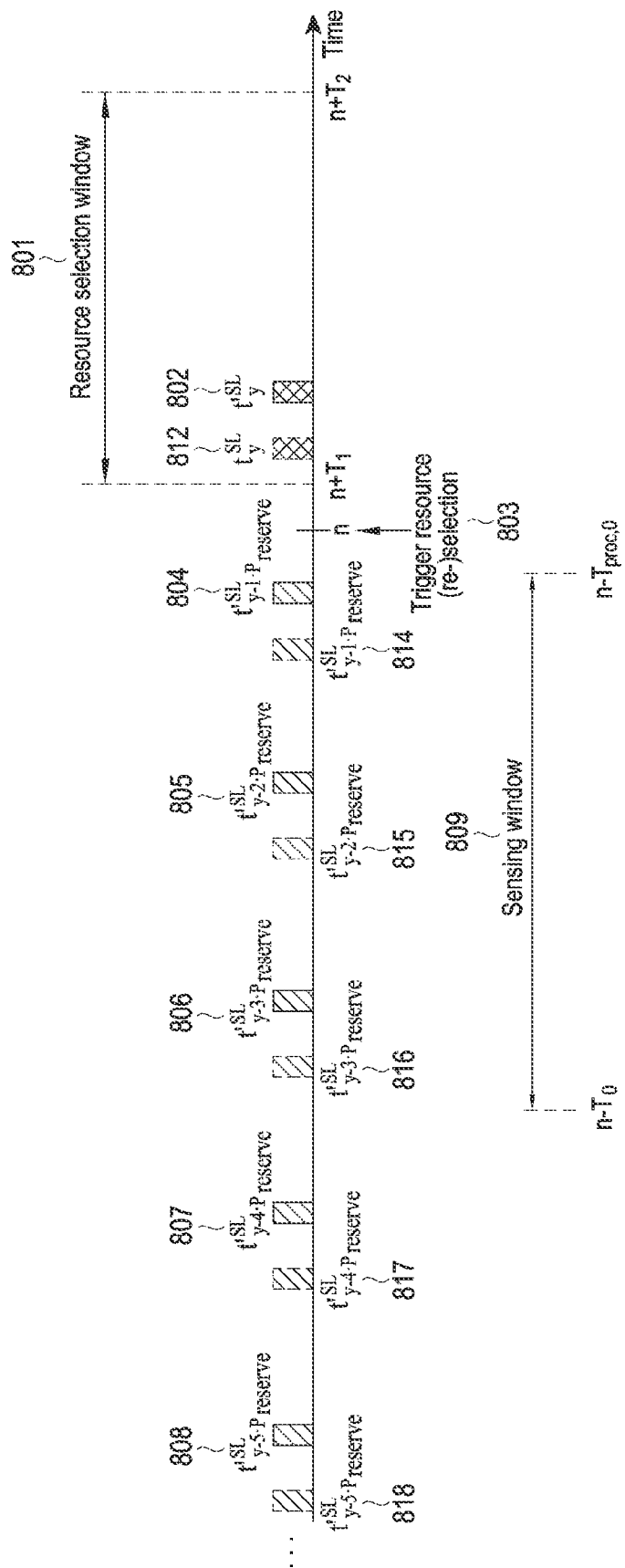
FIG. 8 illustrates a method for performing partial sensing in sidelink communication according to an embodiment.

FIG. 8 illustrates a method for performing partial sensing in sidelink communication according to an embodiment.

Figure 9:
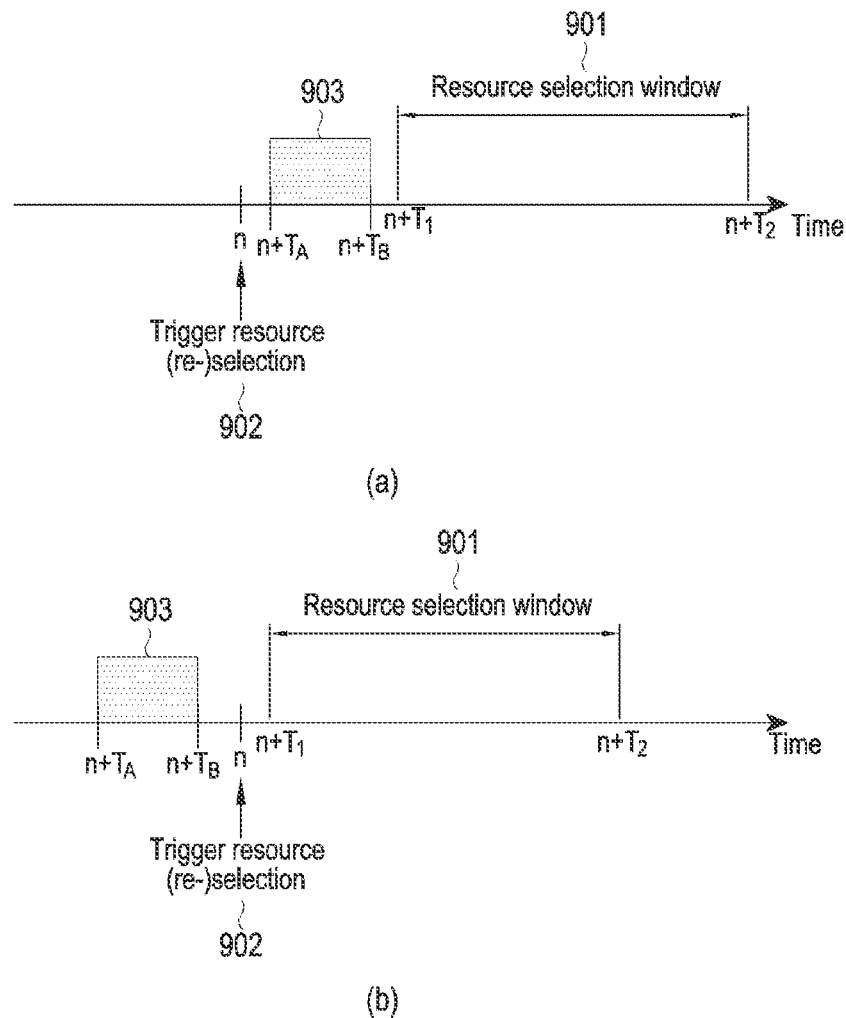
FIG. 9 illustrates a method for performing partial sensing in sidelink communication according to an embodiment.

FIG. 9 illustrates a method for performing partial sensing in sidelink communication according to an embodiment.

Unlike full sensing in FIG. 7, the embodiments of FIGS. 8 and 9 are different methods for determining a slot for performing sensing when the UE operates in partial sensing. However, it is noted that the disclosure is not limited thereto. It is noted in FIGS. 8 and 9 that when partial sensing is performed, the resource selection windows 801 and 901 may be determined as described above in connection with reference numeral 702 of FIG. 7.

FIG. 8 is a method for determining a slot for a UE to perform sensing based on periodic reservation intervals, and may also be referred to as periodic-based partial sensing or may be referred to by other teens.

Referring to FIG. 8, in the resource selection window 801, Y (≥1) candidate slot(s) for resource selection may be selected. In this case, the Y candidate slot(s) may be contiguously or non-contiguously selected in time in the resource selection window. The minimum value of Y may be (pre-)configured. The final selection of the Y value and which slot is to be selected may be determined by the UE implementation. In this case, one of the Y candidate slogs) is indicated, as $t'SL_y$, by 802. As described with reference to FIG. 3, $t'SL_y$ may indicate the sidelink slot belonging to the resource pool. In this case, the slot in which the UE performs sensing through periodic-based partial sensing may be determined as $t'SL_y-k \times P_{reserve}$. The vector y denotes Y candidate slot(s), and if there is only one slot, it may be expressed as y as in FIG. 8. The vector $P_{reserve}$ is the value corresponding to the periodic reservation interval and may include one or more values. If this value is one value, it may be expressed as $P_{reserve}$ as in FIG. 8. The value included in $P_{reserve}$ may be determined from the (pre-)configured, periodic reservation interval list, sl-ResoureReservePeriodList, and the following methods may be considered. However, it is noted that the disclosure is not limited to Methods 1-1 to 1-3 below.

Method 1-1: All of the values included in sl-ResoureReservePeriedList are used

Method 1-2: Only some (subset) of the values included in sl-ResoureReserrePeriodList are used Method 1-3: A common divisor of the values included in sl-ResoureReservePeriodList is used In $t'^{SL}_{y-k} \times P_{reserve}$, the vector k is a value that determines the number of slots performing partial sensing. The interval between the sensing slots may be determined by the reservation interval included in $P_{reserve}$. FIG. 8 illustrates an example where k is 1, 2, 3, 4, and 5. To determine k, at least one of the following Methods 2-1 to 2-6 may be considered. It should be noted, however, that the disclosure is not limited to the below methods.

Method 2-1: Only one latest slot before Y candidate slot(s) considering the processing time for resource selection or before the time 803 when resource (re-)selection is triggered may be selected. For example, according to FIG. 8, only the slot corresponding to 804 as the slot for performing partial sensing for the candidate slot 802 for resource selection may be selected. Only the slot corresponding to 814 as the slot for performing partial sensing for the candidate slot 812 for resource selection may be selected.

Method 2-2: Only two latest slots before Y candidate slot(s) considering the processing time for resource selection or before the time 803 when resource (re-)selection is triggered may be selected. For example, according to FIG. 8, only the slots corresponding to 804 and 805 as the slots for performing partial sensing for the candidate slot 802 may be selected. Only the slots corresponding to 814 and 815 as the slots for performing partial sensing for the candidate slot 812 may be selected.

Method 2-3: All of the slots in the set sensing window $[n-T_0, n-T_{proc,0}]$ may be determined as $t'^{SL}_{y-k} \times P_{reserve}$. For example, according to FIG. 8, when the sensing window $[n-T_0, n-T_{proc,0}]$ is set as denoted by 809, slots corresponding to reference numbers 804, 805, and 806 may be selected as slots for performing sensing on the candidate slot 802. Slots corresponding to reference numbers 814, 815, and 816 may be selected as slots for performing sensing on the candidate slot 812.

Method 2-4: In $P_{reserve}$, k is determined so that only one slot is selected for one reservation interval, and k may be determined by the UE implementation. The maximum value of k may be (pre-)configured. For example, according to FIG. 8, the UE determines k=2 for the candidate slot 802 and only the slot corresponding to the 805 may be selected as a slot for performing partial sensing. The UE determines k=2 for the candidate slot 812 and only the slot corresponding to the 815 may be selected as a slot for performing partial sensing.

Method 2-5: One or more values of k may be (pre-)configured by a method for (pre-) configuring k. For example, according to FIG. 8, only the slots corresponding to reference numbers 804 and 805 as the slots for performing partial sensing when k=1 and 2 is (pre-)configured for the candidate slot 802 may be selected. Only the slots corresponding to 814 and 815 as the slots for performing partial sensing when k=1 and 2 is (pre-)configured for the candidate slot 812 may be selected. A method for (pre-)configuring k with a different value depending on the channel busy ratio (CBR) which is the measurement indicating the channel congestion state may be considered. In general, as the channel congestion increases, the measured CBR value increases, as required to prevent collision of the selected resource by performing better sensing when the channel is more congested. Therefore, a larger k value needs to be used when the CBR value is higher. A threshold for the CBR value for selecting k may be determined by the UE implementation or (pre-)configured. In this case, the threshold of the CBR value may also be determined as a different value depending on priority.

Method 2-6: k is (pre-)configured and determined using a bitmap. For example, according to FIG. 8, when a bitmap with a length of 5 is used for the candidate slot 802 when the bitmap is (pre-)configured as [10110], only slots corresponding to reference numbers 805, 806, and 808 may be selected as slots for performing partial sensing. When a bitmap with a length of 5 is used for the candidate slot 812 and is (pre-)configured as [10110], only slots corresponding to reference numbers 815, 816, and 818 may be selected as slots for performing partial sensing.

FIG. 9 illustrates another method for performing partial. Unlike the periodic-based partial sensing of FIG. 8, the method presented in FIG. 9 is for performing sensing based on a continuous sensing window and may be referred to as contiguous partial sensing or may be referred to by other terms. Since partial sensing is performed in FIG. 9, a sensing window that is shorter than the sensing window in full sensing of FIG. 7 may be used. Therefore, the sensing window 903 for contiguous partial sensing may be defined as a time period of $[n+T_A, n+T_B]$. In this case, it is noted that for triggering for resource (re)selection, $T_A$ and $T_B$ may be set to positive numbers with respect to time n 902 as shown in section (a) of FIG. 9 or may be set to negative numbers as shown in section (b) of FIG. 9. $T_A$ and $T_B$ may be set to 0.

Figure 10:
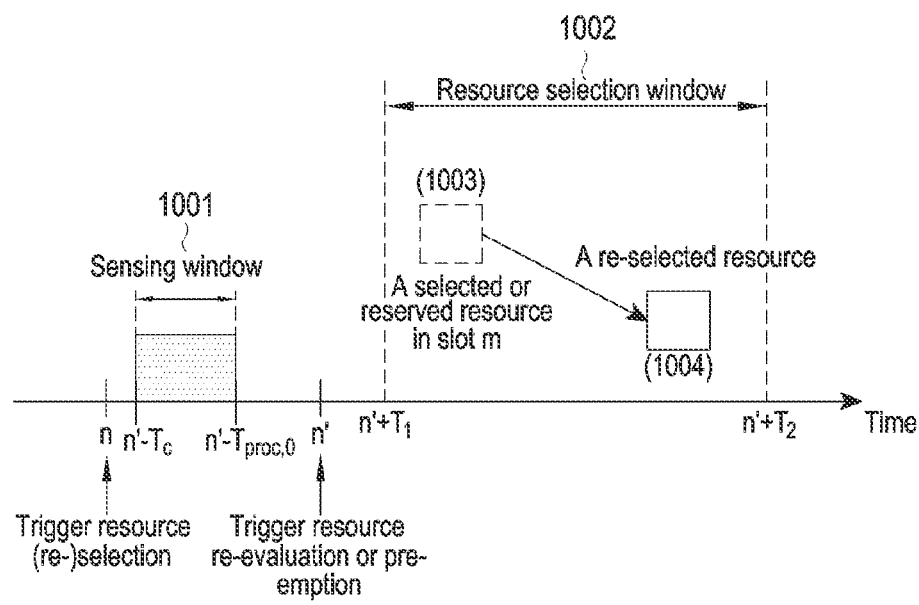
FIG. 10 illustrates a method in which reevaluation or preemption is additionally performed when partial sensing or random selection is performed in sidelink communication according to an embodiment.

FIG. 10 illustrates a method in which reevaluation or preemption is additionally performed when partial sensing or random selection is performed in sidelink communication according to an embodiment.

In contrast to full sensing in FIG. 7, when partial sensing or random selection is performed, different sensing windows need to be set for reevaluation and preemption. According to FIG. 10, when triggering for reevaluation or preemption occurs in slot the sensing window 1001 for reevaluation and preemption may be set to the time period $[n'-T_C, n'-T_{proc,0}]$. Herein, $T_{proc,0}$ is not limited to a specific value but may be set to the same value as $T_{proc,0}$ defined in full sensing as described in connection with FIG. 7, $T_C$ is not limited to a specific value. For example, a value of 32 slots may be used as $T_C$. The resource selection window 1002 may be defined as the time period $[n'+T_1, n'+T_2]$. The description made in connection with FIG. 7 is referenced for $T_1$ and $T_2$. Therefore, when a resource selection mode is determined by partial sensing or random selection in the sidelink, and reevaluation or preemption is additionally performed, the resource 1003 already selected or reserved may be reselected as another resource 1004 in the resource selection window 1002 through the sensing result in the sensing window 1001 for reevaluation and preemption. It is noted that in the case of random selection, only a UE capable of performing sensing may perform reevaluation and preemption.

Figure 11A:
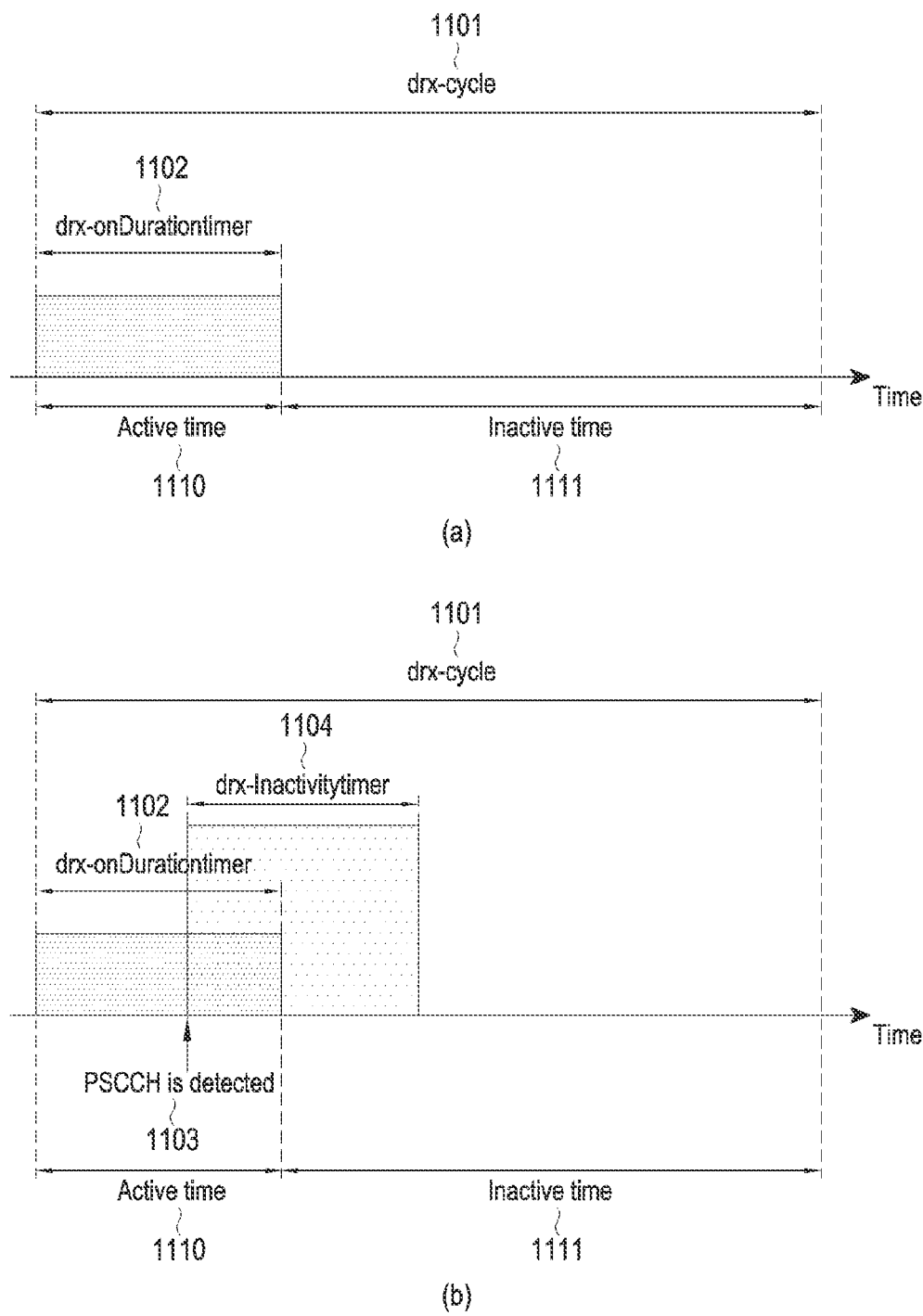
FIG. 11A illustrates an inactive time (or off-duration) and active time (or on-duration) of DRX determined according to a parameter set for DRX when a DRX operation is performed in sidelink communication according to an embodiment.
Figure 11B:
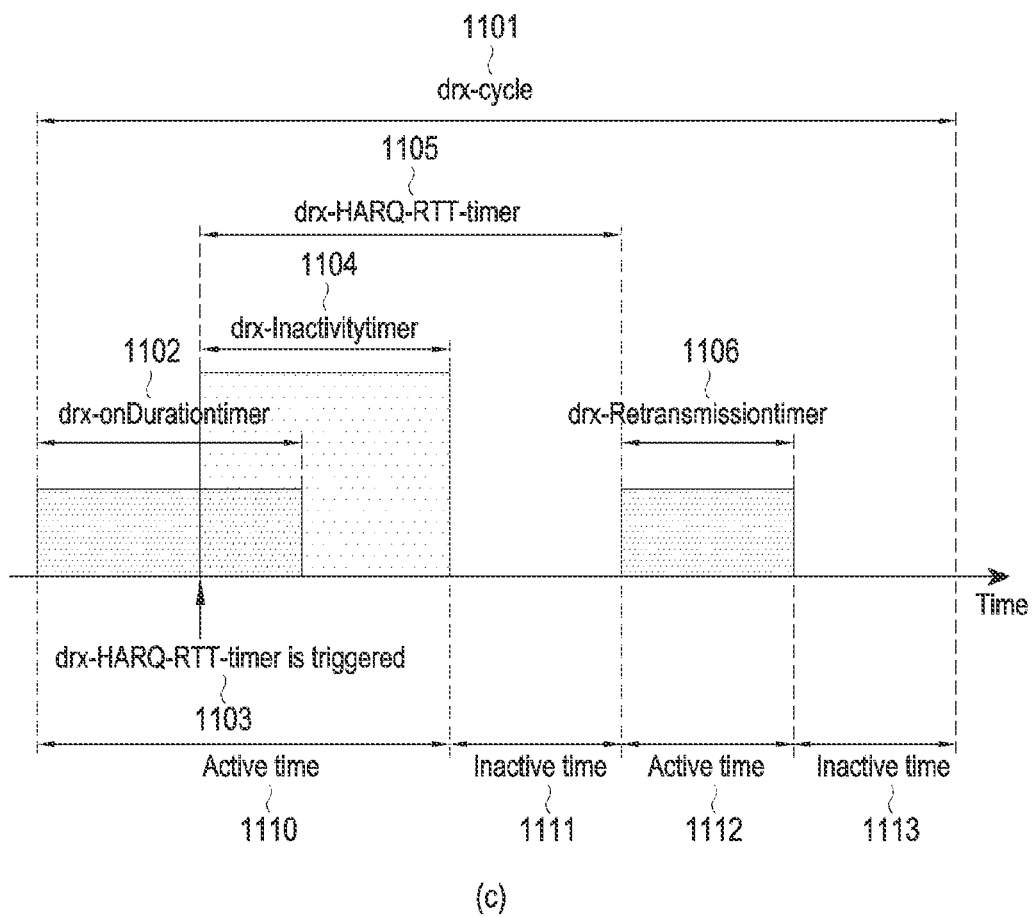
FIG. 11B illustrates an inactive time r off-duration) and active time (or on-duration) of DRX determined according to a parameter set for DRX when a DRX operation is performed in sidelink communication according to an embodiment.

FIG. 11A illustrates an inactive time (or off-duration) and active time (or on-duration) of DRX determined according to a parameter set for DRX when a DRX operation is performed in sidelink communication according to an embodiment. FIG. 11B illustrates an inactive time (or off-duration) and active time (or on-duration) of DRX determined according to a parameter set for DRX when a DRX operation is performed in sidelink communication according to an embodiment.

The UE may perform monitoring/decoding of a sidelink channel for control information and data information for data reception in the period corresponding to the active tune of DRX. In contrast, monitoring/decoding, of control information and data information for data reception may not be performed in the period corresponding to the inactive time of DRX. In sidelink communication, control information includes 1$^{st}$ SCI, which is control information transmitted through PSCCH, and 2$^{nd}$ SCI, which is control information transmitted through PSSCH. Data information may be transmitted through the PSSCH. It may be assumed that control information and data information are always transmitted simultaneously in sidelink communication.

Accordingly, a time point (slot) when control information is received may be the same as a time point (slot) when data information is received.

The following parameters may be considered for determining an inactive time and active time for DRX operation in sidelink communication. However, it is noted that in the disclosure, the parameters for determining the inactive time and active time of DRX are not limited to the parameters presented below. It is also noted that some of the below parameters may not be used in DRX of sidelink communication.

DRX-Related Parameters 1) drx-cycle:

indicates a period to which DRX is applied. A start position (drx-StartOffset) of the drx-cycle 1101 may be set. As shown in sections (a) and (b) of FIG. 11, intervals of the inactive time 1110 and the active time 1111 may be set within the drx-cycle. In sidelink communication, a drx-cycle having a long cycle and a short cycle may be configured.

Figure 11B:
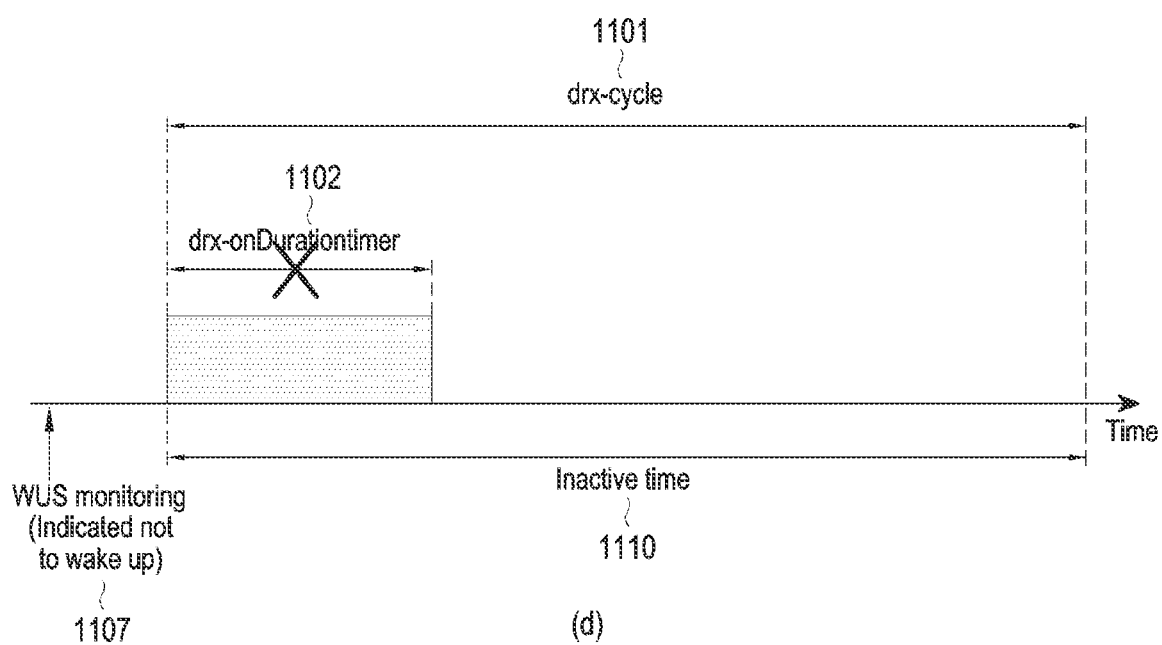

2) drx-onDurationTimer:

is a time period during which it operates in the active time (or on-duration) of DRX in the drx-cycle 1101 and may correspond to the active time 1110 of DRX from the start to expiration of the drx-onDurationTImer 1102. The remaining period of the drx-cycle 1101 after the time when the drx-onDurationTimer 1102 expires may be the inactive time 1111 of DRX. Section (a) of FIG. 11 illustrates an example in which only drx-onDurationTimer 1102 is defined in sidelink communication, and the inactive time 1110 and active time 1111 of DRX are operated.

3) drx-In activityTimer:

If sidelink control information on a PSCCH is detected/received (1103) before the drx-onDurationTimer 1102 expires in the drx-cycle 1101, the active time of DRX may be extended from the time when the control information is detected/received to the time when the drx-InactivityTimer 1104 operates and expires. The remaining period of the drx-cycle 1101 after the time when the drx-InactivityTimer 1104 expires may be the inactive time 1111 of DRX. Section (b) of FIG. 11 illustrates an example in which the drx-onDurationTimer 1102 and the drx-InactivityTimer 1104 are defined in sidelink communication, and the inactive time 1110 and active time 1111 of DRX are operated.

4) drx-HARQ-RTT-Timer:

As shown in section (c) of FIG. 11B, when retransmission is performed in sidelink communication, the drx-HARQ-round trip time-Timer (drx-HARQ-RTT) may be triggered in the active time 1110 of DRX 1101 in the UE (1103). When sidelink control information is received or sidelink control information is received and position information for retransmission is indicated in the sidelink control information ($1^{st}$ SCI), as a condition in which the drx-HARQ-RTT-Timer 1105 is triggered in sidelink communication, the drx-HARQ-RTT-Timer 1105 may be applied until before a next retransmission is received according to the corresponding information. When the drx-HARQ-RTT-Timer 1105 expires, the UE may operate in the active time 1110 of DRX 1101 to receive retransmission. In this case, the active time 1110 of DRX 1101 may be a period in which the drx-RetransmissionTimer 1106 operates, as described below in detail. Since position information about initial transmission and retransmission resource (including information about the presence or absence of retransmission resource) is indicated in the $1^{st}$ SCI as described above, the drx-HARQ-RTT-Timer 1105 may be assumed and defined as a time gap between retransmission resources or a time gap between the initial transmission and retransmission resource indicated in the $1^{st}$ SCI. If it is indicated that no retransmission resource is included in the received $1^{st}$ SCI, the drx-HARQ-RTF-Timer 1105 may not operate. Section (c) of FIG. 11B illustrates an example in which the drx-onDurationTimer 1102, the drx-Inactivity Timer 1104, the drx-HARQ-RTT-Timer 1105, and the drx-RetransmissionTimer 1106 are defined in sidelink communication, and the inactive time 1111, 1113 and active time 1110, 1112 of DRX 1101 are operated.

5) drx-RetransmissionTimer:

In section (c) of FIG. 11B, when retransmission is performed in sidelink communication, the drx-Retransmission-Timer 1106 may operate from the time when the drx-HARQ-RTT-Timer 1105 expires. Therefore; the drx-RetransmissionTimer 1106 does not operate during the time period when the drx-HARQ-RTT-Timer 1105 operates. In sidelink communication, the drx-RetransmissionTimer 1106 may also be determined as a fixed value of one slot or one subframe. In this case, the drx-RetransmissionTimer 1106 may not be defined. However, the disclosure is not limited thereto. In other words, in sidelink communication, the drx-RetransmissionTimer 1106 may be set to a value of one or more slots or one or more subframes. Therefore, as in section (c) of FIG. 11, the period in which the drx-RetransmissionTimer 1106 operates may be set as the active time 1112 of DRX 1101 to receive a retransmission from the counterpart UE (peer UE). The remaining drx-cycle period is set as the inactive time 1113 of DRX 1101, so that the UE may not perform reception of control and data information.

6) drx-SlotOffset:

This may be used to adjust the start position where DRX applies in the sidelink communication when various subcarrier spacings (SCSs) are supported.

7) WUS(wake-up signal) cycle:

As shown in section (d) of FIG. 11B, the WUS cycle may be set when a WUS for saving the power of the UE in sidelink communication is used. Under the assumption that a WUS is transmitted according to the WUS cycle, the UE may monitor (1107) the WUS in the position where the WUS is transmitted. Section (d) of FIG. 11B illustrates an example in which a WUS is used to determine an inactive time and active time of DRX 1101. If the WUS indicates that the UE does not wake up in 1107 as shown in section (d) of FIG. 11B, the UE does not operate the drx-onDurationTimer 1102 in the drx-cycle 1101, and the entire drx-cycle may be set to the inactive time 1110 of DRX 1101. In contrast, when the WUS indicates that the UE wakes up in 1107, the UE may perform the operation as shown in sections (a) and (b) of FIG. 11A or section (c) of FIG. 11B according to a configured DRX parameter.

According to the above description, the active time (or on-duration) in DRX may be defined under the following conditions. For example, when a DRX cycle is set in sidelink communication, the active time (or on-duration) may correspond to a time period when the drx-onDurationTimer or drx-InactivityTimer or drx-RetransmissionTimer operates.

As mentioned above, some of the parameters may not be used in sidelink DRX or other parameters may be additionally considered. It is noted that the parameters may vary depending on the transmission methods, such as broadcast, unicast, or groupcast in sidelink communication. In the disclosure, a method for setting the parameter information is not limited to a specific method. The information may be (pre-)configured and, in the case of unicast, may be configured through PC5-RRC or sidelink MAC-CE.

As described above, in a time period set as an inactive time as DRX is applied in sidelink communication, the UE may not perform monitoring/decoding on the above-described control information and data information. The control information may include $1^{st}$ SCI and $2^{nd}$ SCI information. As described above, Mode2 sensing in sidelink communication (i.e., a scheme in which the UE directly allocates/selects a transmission resource of sidelink communication through sensing) is an operation in which the UE monitors the sidelink channel and includes decoding of the PSCCH (in other words, decoding of $1^{st}$ SCI) and SL-RSRP measurement. If in sidelink communication, monitoring/decoding ($1^{st}$ SCI and $2^{nd}$ SCI) of control information for data reception in the period set as the inactive time of DRX is not allowed, but monitoring/decoding of control information ($1^{st}$ SCI) for sensing for resource selection is allowed, the sensing may be performed in the inactive time of DRX, so that the UE performing DRX in sidelink communication may not experience issues when the sensing operations described in connection with FIGS. 7 to 10 are performed. However, when neither monitoring/decoding of control information for data reception in the period set as the inactive time of DRX nor monitoring/decoding of control information ($1^{st}$ SCI) for sensing in sidelink communication is allowed, issues may occur with the Mode2 sensing operation. The first embodiment below teaches UE operations and a method for addressing issues that may arise in the Mode2 sensing operation. When the Tx UE (peer UE) transmitting sidelink data to the Rx UE performing the DRX operation performs Mode2 sensing to select a resource, the Rx UE needs to be able to receive data. Thus, it is needed to define UE operations considering such an occasion.

First Embodiment

The first embodiment discloses an operation method for Mode2 sensing and resource selection when neither monitoring/decoding of control information ($1^{st}$ SCI and $2^{nd}$ SCI) for data reception nor monitoring/decoding of control information ($1^{st}$ SCI) for sensing in the period set as the inactive time of DRX in the sidelink is allowed. In such a case, the UE may not perform sensing in the period set as the inactive time of DRX in sidelink communication. If the period (slot) (refer to the sensing period of FIGS. 7 to 10) for performing sensing overlaps the inactive time of DRX when the UE needs to perform sidelink DRX and Mode2 sensing, the following methods may be considered as UE operations. It is noted that the disclosure is not limited to the following sensing methods and two or more of the following sensing methods may be combined and used.

Sensing Method 1: The sensing period (slot) is adjusted to the active time of sidelink DRX to be able to secure a preset sensing period (slot), and the UE performs sensing in the corresponding sensing period (slot).

Sensing Method 2: The UE performs sensing only in the period (slot) corresponding to the active time of sidelink DRX in the preset sensing period (slot).

According to sensing Method 2, sensing may be performed only when at least part of the preset sensing period (slot) corresponds to the active time of sidelink DRX. If all of the preset sensing period (slot) corresponds to the inactive time of sidelink DRX, sensing may not be performed. To address this issue, the UE may adjust time n when the resource (re-)selection triggering is performed so that part of the sensing period (slot) is included in the active time of sidelink DRX. The UE may identify whether part of the sensing period (slot) is included in the active time of sidelink DRX based on DRX-related configuration information.

Sensing Method 3: The does not perform sensing. In this case, random selection may be used for resource selection.

Sensing Method 4: This is a combination of sensing Method 2 and sensing Method 3 and references embodiments 2 and 3 described below in detail.

Sensing Method 5: A preset sensing period (slot) is set as the active time of sidelink DRX, and the UE performs sensing in the set sensing period (slot).

According to sensing Method 5, setting the sensing period (slot) as the active time of sidelink DRX may be determined so that monitoring/decoding of control information $1^{st}$ SCI) is allowed only for sensing for resource selection but monitoring/decoding of control information ($1^{st}$ SCI and $2^{nd}$ SCI) for data reception is not allowed. In contrast, it may be determined that monitoring/decoding of control information ($1^{st}$ SCI) is allowed for the purpose of sensing for resource selection as well as control information ($1^{st}$ SCI and $2^{nd}$ SCI) for data reception.

If sensing Method 5 allows decoding of control information ($1^{st}$ SCI and $2^{nd}$ SCI) for data reception, the corresponding information may be additionally indicated for data transmission/reception between UEs in sidelink communication. In this case, various indication methods may be used. In general, an indication to match DRX wake-up times through SCI ($1^{st}$ SCI or $2^{nd}$ SCI) may be provided. In contrast, in unicast, the corresponding indication may be provided through PC5-RRC or sidelink MAC CE. The method for indication through SCI may advantageously be used in all of broadcast, groupcast, and unicast. The indication method for matching sidelink DRX wake-up times in sensing Method 5 may be supported even when setting the sensing period (slot) as the active time of sidelink DRX may be determined so that decoding of control information $1^{st}$ SCI) is allowed only for sensing for resource selection but monitoring/decoding of control information ($1^{st}$ SCI and $2^{nd}$ SCI) for data reception is not allowed.

Figure 12:
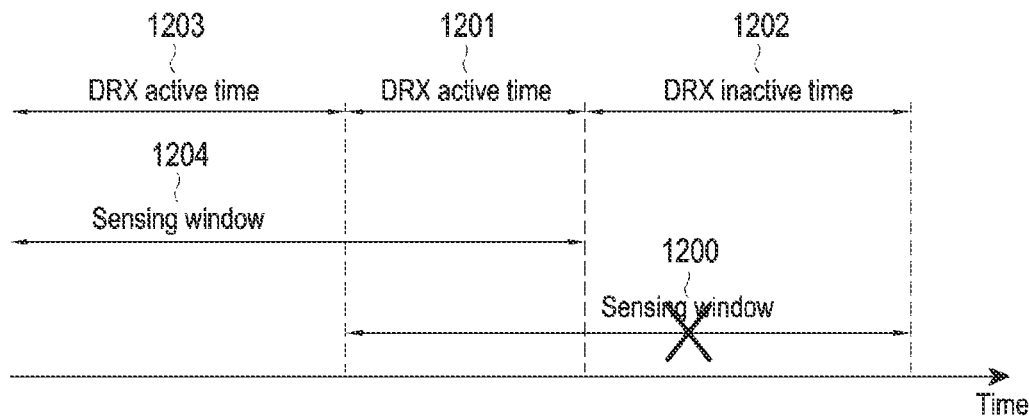
FIG. 12 illustrates a sensing method of a UE according to an embodiment.
Figure 12:
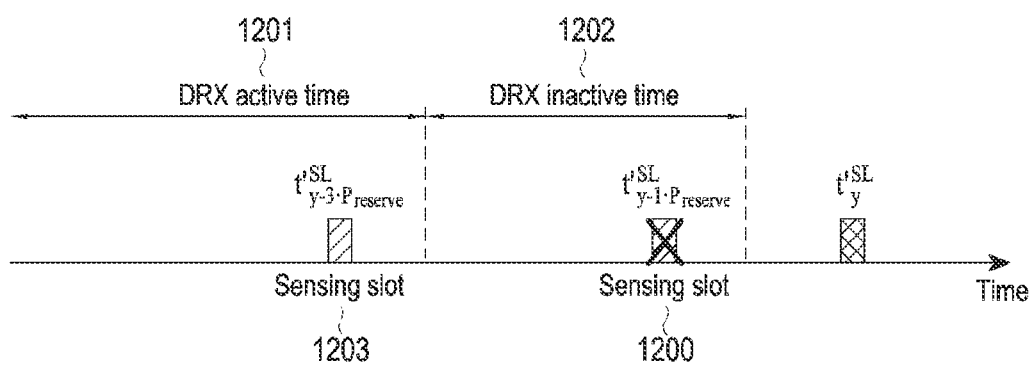

FIG. 12 illustrates sensing Method 1 of a UE according to an embodiment.

Section (a) of FIG. 12 illustrates an example in which the sensing period set to perform reevaluation and preemption when full sensing of FIG. 7 and contiguous partial sensing of FIG. 9 and partial sensing and random selection of FIG. 10 are performed is adjusted by sensing Method 1. According to sensing Method 1, extension of the sensing period may be possible only in the period set as the DRX active time 1201. Section (a) of FIG. 12 illustrates an example in which a sensing period 1200 is set and a portion of the sensing period overlaps the DRX inactive time (1202). Section (a) of FIG. 12 shows an example in which a DRX active time 1201, 1203 and an inactive time 1202 are configured, and it is noted that various active times and inactive times of DRX may be generated depending on DRX parameters. Since part of the sensing period 1200 is set as the inactive time period 1202 of DRX so that sensing cannot be performed in the inactive time period 1202 in section (a) of FIG. 12, the sensing period may be adjusted to further guarantee a sensing period according to sensing Method 1 and may be extended and operated as denoted by sensing window 1204. In this case, the extended sensing period may be set in the active time 1203 of DRX. If the active tithe period of DRX is non-contiguous, the extended sensing period may also be set to be non-contiguous.

Section (b) of FIG. 12 illustrates an example in which a sensing period (slot) set for performing periodic-based partial sensing of the embodiment of FIG. 8 is adjusted by sensing Method 1. When DRX is not configured and operated in the sidelink, the methods described in connection with the embodiment of FIG. 8 may be used to determine a sensing period (slot) set for performing periodic-based partial sensing. However, if DRX is operated in sidelink communication so that the period (slot in which sensing is performed overlaps the inactive time of DRX, a sensing period (slot) may be determined according to sensing Method 1. When DRX is not configured and operated in sidelink communication, the sensing slot 1200 of section (b) of FIG. 12 is set, and the LE may perform sensing in the corresponding slot 1200. However, if DRX is operated so that the period (slot) in which sensing is performed in sidelink communication overlaps (1200) the inactive time of DRX as shown in section (b) of FIG. 12, the UE may not perform sensing in the overlapping (1200) period. In this case, in section (b) of FIG. 12, the sensing slot 1203 is adjusted to be set in the active time period 1201 of DRX, rather than being set in the overlapping period 1200, by sensing Method 1, so that sensing is rendered possible in the corresponding period. Accordingly, sensing Method 1 may be interpreted as a method of limiting the period (slot) for performing sensing to be set in the active time of DRX when applied to periodic-based partial sensing.

According to sensing Method 5, the active time (or on-duration) in DRX may be set under the following conditions.

When a DRX cycle is set in sidelink communication, conditions for setting an active time (or on-duration) may include at least one of the following conditions.

Condition 1: When drx-onDurationTimer or drx-InactivityTimer or drx-RetransmissionTimer operates
 Condition 2: When the sensing period (slot) operates (when sensing is performed in the sensing period (slot))

Setting a DRX cycle in sidelink communication in sensing Method 5 may be interpreted as performing DRX in sidelink communication. The instance of when the sensing period (slot) operates may be interpreted as where the sensing period (slot) is an occasion when the timer for DRX active time is running. It is noted that the methods of the first embodiment as described above may apply to the sensing methods described in connection with FIGS. 7 to 10.

Second Embodiment

Disclosed in the second embodiment are UE operations when sensing Methods 2 to 4 described in connection with the first embodiment are applied to a sensing period (slot) set for performing periodic-based partial sensing of FIG. 8. As described above, according to sensing Method 2, sensing may be performed only when at least part of the preset sensing period (slot) corresponds to the active time of sidelink DRX. If all of the preset sensing period (slot) corresponds to the inactive time of sidelink DRX, sensing may not be performed. Accordingly, for sensing Method 2 to be operable full-time, it is needed to apply sensing Method 3 or, as in sensing Method 4, to apply sensing Method 2 and sensing Method 3 selectively according to predetermined conditions in the above-described case.

Figure 13:
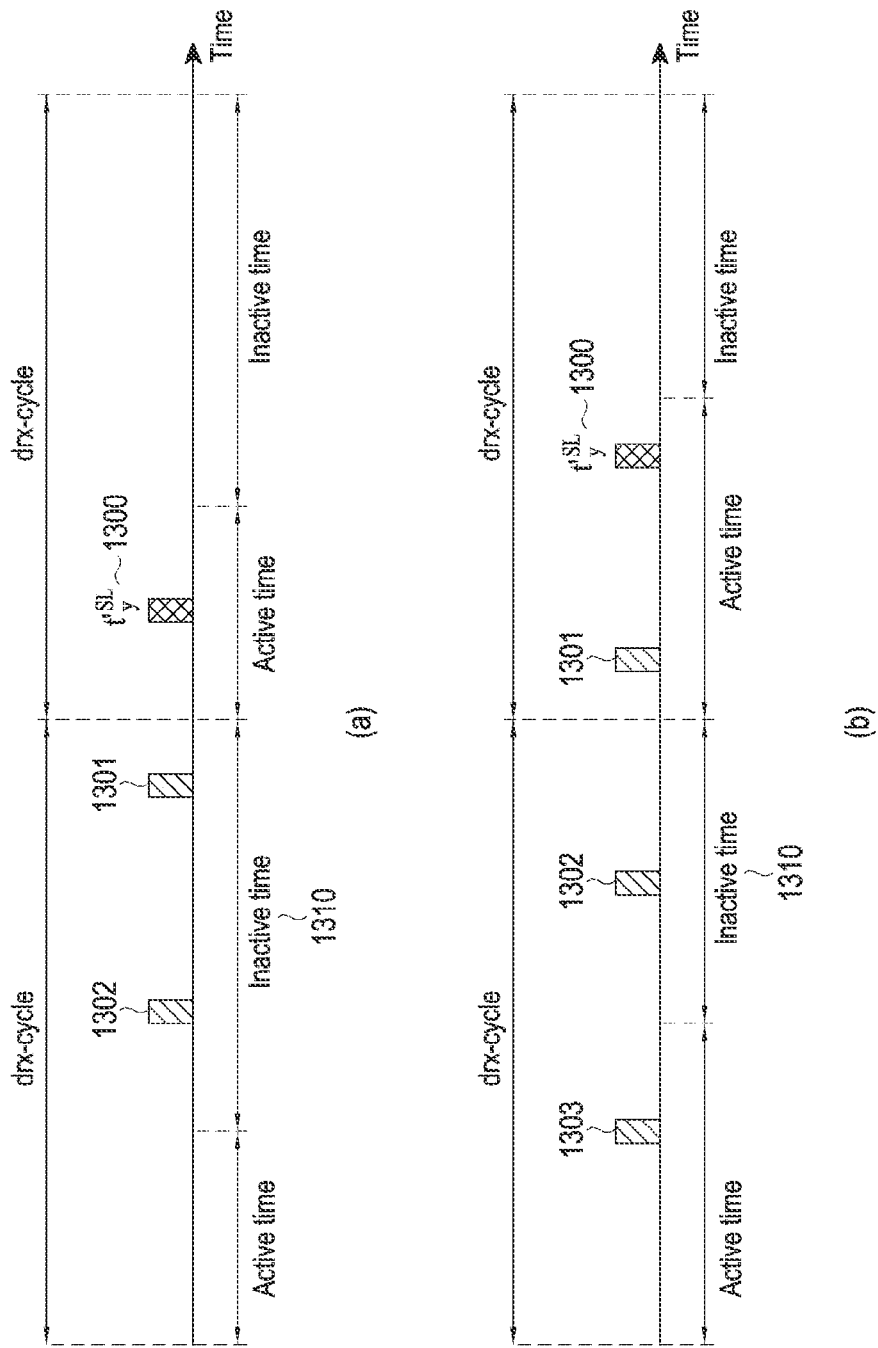
FIG. 13 illustrates a sensing method of a UE according to an embodiment.

FIG. 13 illustrates sensing Methods 2 to 4 of a UE according to an embodiment.

Section (a) of FIG. 13 illustrates an example in which X=2 monitoring slots 1301 and 1302 are set as slots for performing partial sensing from one slot $t'^{SL}_y$ 1300 among Y candidate slots selected to perform periodic-based partial sensing as described in connection with FIG. 8, but the corresponding slots all are included in the inactive time 1310 of sidelink DRX. When X(≥1) monitoring slots are set to perform periodic-based partial sensing but the corresponding slots are included in the inactive time of sidelink DRX so that an available sensing period (slot) is not secured as shown in section (a) of FIG. 13, the UE does not perform sensing and random to selection may be used for resource selection as in sensing Method 3.

Section (b) of FIG. 13 illustrates an example in which X=3 monitoring slots 1301, 1302, and 1303 are set as slots for performing partial sensing from one slot $t'^{SL}_y$ 1300 among Y candidate slots selected to perform periodic-based partial sensing as described in connection with FIG. 8, but one slot 1302 of the slots is included in the inactive time 1310 of sidelink DRX while the other two slots 1301 and 1303 are included in the active time of sidelink DRX. In a case where X(≥1) monitoring slots are set to perform periodic-based partial sensing but only slots corresponding to Y(1≤Y≤X) are included in the active time of sidelink DRX and are available for sensing as shown in section (b) of FIG. 13, sensing Method 2 may be used or sensing Method 4 may be considered as follows. Specifically, according to sensing Method 2, if the UE performs periodic-based partial sensing in Y available sensing slots, and unavailable X-Y(≥0) slots occur, the corresponding slots are not used for sensing.

Sensing Method 4 is for determining whether sensing Method 2 or sensing Method 3 is selected under what conditions. Specifically, according to sensing Method 4, if Y is N % of X or more, periodic-based partial sensing is performed in Y slots by sensing Method 2. Otherwise, according to sensing Method 3, sensing is not performed, and random selection may be used for resource selection, N=100 indicates when X=Y (i.e., when all set monitoring slots are available), which indicates that sensing Method 3 is selected if at least one slot incapable of sensing is caused from among X monitoring slots by the inactive time of sidelink DRX.

In sensing Method 4, N may be fixed to a specific value or is settable. When N may be set, a method of (pre-)configuration may be used and, if PC5-RRC is available as in unicast, a method for setting it through PC5-RRC or sidelink MAC CE may be considered. A method in which N is included in SCI ($1^{st}$ SCI or $2^{nd}$ SCI) and indicated may also be considered. When N is settable, a method in which N is set in association with the channel busy ratio (CBR) may also be considered. In sidelink communication, the UE may measure the CBR, and as the channel congestion increases, the measured CBR value may rise. In general, as channel congestion increases, improved sensing needs to be performed to avoid collision in resource selection. Accordingly, it may be supported that N varies depending on the CBR value (or CBR level.

The measured CBR value may be mapped to a defined CBR level). Specifically, as the CBR value decreases, a lower N value may be set so that sensing Method 2 may be more frequently selected by sensing Method 4. In this method, the threshold for the CBR value may be set to differ depending on priority. The threshold for the CBR value for determining N may be determined by UE implementation or may be (pre-)configured.

As shown in section (b) of FIG. 13, X(≥1) monitoring slots are set to perform periodic-based partial sensing. However, in a case where only slots corresponding to Y(1≤Y≤X) are included in the active time of sidelink DRX and are available for sensing, the condition under which one of sensing Method 2 and sensing Method 3 is selected by sensing Method 4 is not limited to only when Y is N % of X or more. For example, as another condition, the case where the active time is N % more in the drx-cycle may be considered. The active time may be limited only to the active time determined by the drx-onDurationTimer. This is why drx-InactivityTimer or drx-RetransmissionTimer may operate irrelevant to contexts. In this case, when the active time is N % more in the drx-cycle, sensing Method 2 may apply, otherwise, sensing Method 3 may apply. This method has been disclosed considering that sensing is difficult to perform when much active time is not secured in the drx-cycle.

Third Embodiment

The third embodiment discloses UE operations when sensing Methods 2 to 4 described in connection with the second embodiment are applied to a sensing period set to perform reevaluation and preemption when the full sensing of FIG. 7, contiguous partial sensing of FIG. 9, and partial sensing and random selection of FIG. 10 are performed.

As described above; according to sensing Method 2, the UE may perform sensing only when at least part of the preset sensing period (slot) corresponds to the active time of sidelink DRX. If all of the preset sensing period (slot) corresponds to the inactive time of sidelink DRX, the UE may not perform sensing. Accordingly, for sensing Method 2 to be operable full-time, it is needed to apply sensing Method 3 or, as in sensing Method 4, to apply sensing Method 2 and sensing Method 3 selectively according to predetermined conditions in the above-described case.

Figure 14:
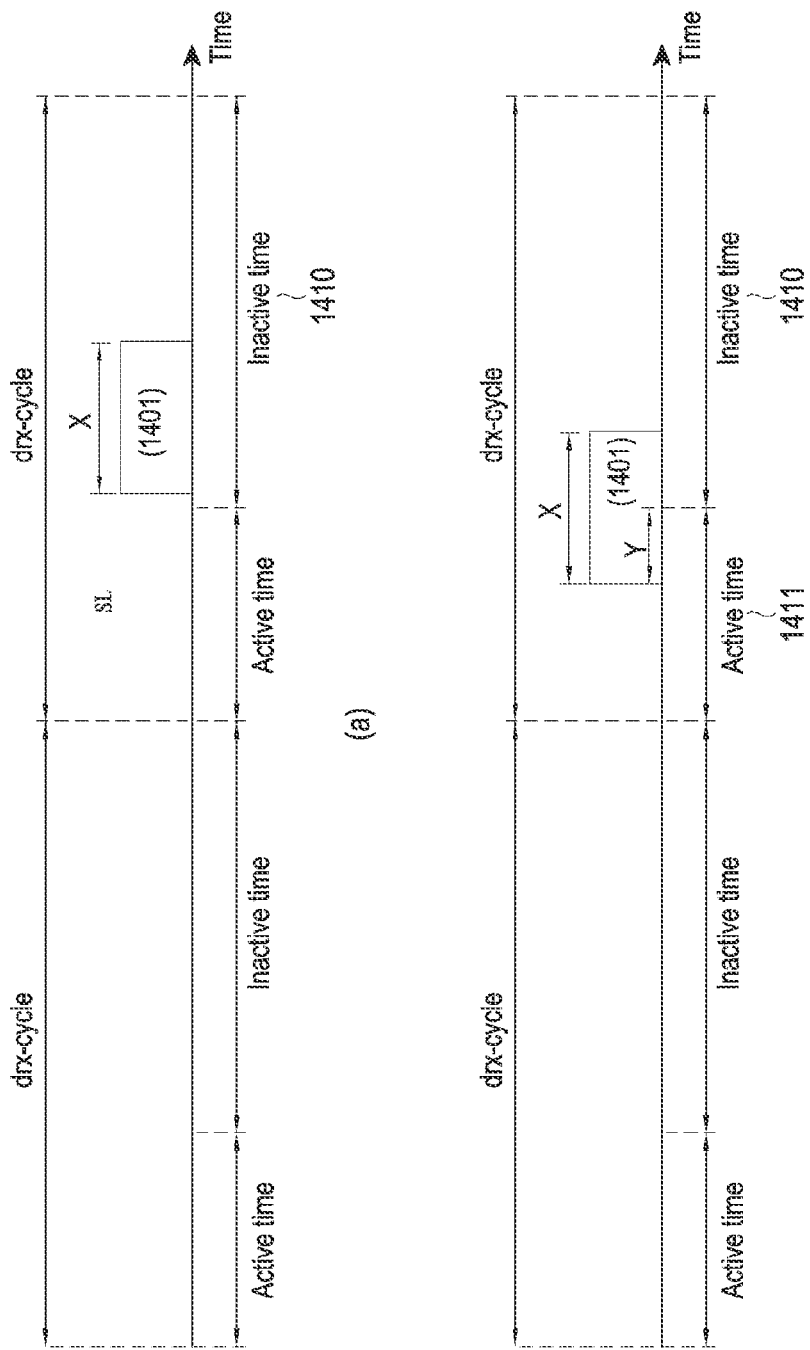
FIG. 14 illustrates a sensing method of a UE according to an embodiment.

FIG. 14 illustrates sensing Methods 2 to 4 according to an embodiment.

Section (a) of FIG. 14 illustrates an example in which the sensing period 1401 set to perform reevaluation and pre-emption when full sensing of FIG. 7 and contiguous partial sensing of FIG. 9 and partial sensing and random selection of FIG. 10 are performed is fully included in the inactive time 1410 of sidelink DRX. When a sensing period (slot) with a length of X is set but the corresponding slots are included in the inactive time of sidelink DRX so that an available sensing period (slot) is not secured as shown in section (a) of FIG. 14, sensing is not performed, and random selection may be used for resource selection as in sensing Method 3.

Section (b) of FIG. 14 illustrates an example in which only a portion of the sensing period 1401 set to perform reevaluation and preemption when full sensing of FIG. 7 and contiguous partial sensing of FIG. 9 and partial sensing and random selection of FIG. 10 are performed is included in the inactive time 1410 of sidelink DRX while the rest of the sensing period 1401 is included in the active time 1411 of sidelink DRX. When a sensing period (slot) with a length of X is set but only slots corresponding to a length of Y(Y≤X) are included in the active time of sidelink DRX and are available for sensing as shown in section (b) of FIG. 14, sensing Method 2 may be used or sensing Method 4 may be considered as follows.

Specifically, according to sensing Method 2, if the UE performs monitoring only in the sensing slot corresponding to a length of Y, and an area with a length of X-Y(≥0) which is unavailable occurs, the corresponding area is not to be used for sensing, Sensing Method 4 is for determining whether sensing Method 2 or sensing Method 3 is selected under predetermined conditions. Specifically, according to sensing Method 4, if Y is N % of X or more, sensing is performed in Y slots by sensing Method 2. Otherwise, according to sensing Method 3, sensing is not performed, and random selection may be used for resource selection. N=100 indicates when X=Y (i.e., when all set slots are available), which indicates that sensing Method 3 is selected if there is an area incapable of sensing of the sensing period (slot) with a length of X by the is inactive tune of sidelink DRX. In sensing Method 4, N may be fixed to a specific value or is settable. When N is settable, a method of (pre-)configuration may be used and, if PC5-RRC is available as in unicast, a method for setting it through PC5-RRC or sidelink MAC CE may be considered. A method in which N is included in SCI ($1^{st}$ SCI or $2^{nd}$ SCI) and indicated may also be considered. When N is settable, a method in which N is set in association with the CBR may also be considered.

In the sidelink, the UE may measure the CBR, and as the channel congestion increases, the measured CBR value may increase. In general, as channel congestion increases, improved sensing needs to be performed to avoid collision in resource selection. Accordingly, it may be supported that N varies depending on the CBR value (or CBR level. The measured CBR value may be mapped to a defined CBR level). Specifically, as the CBR value decreases, a lower N value may be set so that sensing Method 2 may be more frequently selected by sensing Method 4. In this method, the threshold for the CBR value may be set to differ depending on priority. The threshold for the CBR value for determining N may be determined by UE implementation or may be (pre-)configured. In section (b) of FIG. 14, a sensing period (slot) with a length of X is set. However, when only the sensing period (slot) corresponding to a length of Y(Y≤X) is included in the active time of sidelink DRX and are available for sensing, the condition under which one of sensing Method 2 and sensing Method 3 is selected by sensing Method 4 is not limited to only when Y is N % of X or more. For example, as another condition, when the active time is N % more in the drx-cycle may be considered. The active time may be limited only to the active time determined by the drx-onDurationTimer. This is why drx-InactivityTimer or drx-RetransmissionTimer may operate or not depending on contexts. In this case, when the active time is N % more in the drx-cycle, sensing Method 2 may apply. Otherwise, sensing Method 3 may apply. This method has been disclosed considering that sensing is difficult to perform when much active time is not secured in the drx-cycle.

Fourth Embodiment

In the fourth embodiment, when the Tx UE (peer UE) transmitting sidelink data to the Rx UE performing the DRX operation performs the above-described Mode2 sensing (i.e., a scheme in which the UE directly allocates/selects a transmission resource of sidelink communication through sensing) to select a resource, the Rx UE needs to be able to receive data. Thus, it is necessary to define UE operations considering such an occasion. In other words, unlike when DRX is not operated in sidelink communication, when DRX is operated in sidelink communication, a different operation needs to be defined in which the UE determines a resource selection window.

Specifically, if UE B transmits sidelink data to UE A in the period when UE A operates in the DRX inactive time in sidelink communication, UE A may not receive the sidelink data. Accordingly, the Tx UE (peer UE) transmitting sidelink data to the Rx UE performing DRX needs to determine a resource selection window to allow the Rx UE to receive the transmitted data when performing Mode2 sensing to select a resource. Thus, the following methods may be considered as UE operations. It is noted that the disclosure is not limited to the following resource selection methods and that two or more of the following resource selection methods may be combined and used.

Resource selection Method 1: The resource selection window is adjusted to the active time of sidelink DRX, and the UE selects a resource in the corresponding period (slot).

According to resource selection Method 1, even when the resource selection window to [$n+T_1$, $n\pm T_2$] is adjusted to the active time of sidelink DRX as described in connection with FIG. 7, $T_2$ may be selected by the UE within the range that meets the remaining packet delay budget (PDB). According to resource selection Method 1, as compared with when the UE determines a resource selection window when sidelink DRX is not operated, only when sidelink DRX is operated, and a resource is selected only in the active time of DRX, the Rx UE may receive the corresponding transmission, so that the length of the resource selection window determined by the UE may be adjusted. Such an issue may arise in which the resource selection window is adjusted to the active time of DRX due to the PDB so that no selectable resource candidate may be secured. To address this, the UE may adjust time n of the resource (re-)selection triggering so that the resource selection window includes at least the active time of sidelink DRX.

In resource selection Method 1, if the resource selection window is adjusted to the active time of sidelink DRX so that there is no selectable PSSCH resource, the Tx UE may select a transmission resource in the exceptional pool. In this case, the exceptional pool may be appreciated as a resource pool in which sidelink transmission/reception is always possible independently from sidelink DRX. The exceptional pool may be appreciated as a provisional resource pool preconfigured, except for the sidelink resource pool through the above-described (pre-)configuration so that sidelink transmission/reception is possible independently from DRX. As another example, if available resources for sidelink communication are sufficient, it may also be possible to allocate a resource to the UE using a configured grant scheme, to ensure resource allocation through the exceptional pool. Resource selection in the exceptional pool may be performed as random selection without performing sensing by the UE. Even when selecting a resource using the exceptional pool, the above-described operation in which the Tx UE transmits SCI including resource allocation information through the PSCCH to the Rx UE may be performed in the same manner. The exceptional pool may be configured through at least one of RRC information, SIB information or other higher layer signaling information or DCI, SCI information or other L1 signaling information. As such, the exceptional pool may be used when there is no resource that may be selected or reselected by the UE within the resource selection window.

Resource selection Method 2: The UE determines the resource selection window without considering sidelink DRX and selects a resource only in the corresponding area, as the active time of DRX in the corresponding period (slot).

According to resource selection Method 2, the resource selection window [$n+T_1$, $n+T_2$] may be determined as described in connection with FIG. 7. A selectable resource candidate occurs only when at least a portion of the resource selection window corresponds to the active time of sidelink DRX. If the entire resource selection window corresponds to the inactive time of sidelink DRX, such an issue in which there is no selectable resource candidate may arise. To address this, the UE may adjust time n of the resource (re-)selection triggering so that the resource selection window includes at least the active time of sidelink DRX.

In resource selection Method 2, if a resource needs to be selected only in the corresponding area as the active time of DRX in the resource selection window, if there is no selectable PSSCH resource, the Tx UE may select a transmission resource in the exceptional pool. In this case, the exceptional pool may be appreciated as a pool in which sidelink transmission/reception is always possible independently from sidelink DRX. The exceptional pool may be appreciated as a provisional resource pool preconfigured, except for the sidelink resource pool configured through the above-described (pre-)configuration so that sidelink transmission/reception is possible independently from DRX. As another example, if available resources for sidelink communication are sufficient, it may also be possible to allocate a resource to the UE using a configured grant scheme, to ensure resource allocation through the exceptional pool. Resource selection in the exceptional pool may be performed as random selection without performing sensing.

Even when selecting a resource using the exceptional pool, the above-described operation in which the Tx UE transmits SCI including resource allocation information through the PSCCH to the Rx UE may be performed in the same manner. The exceptional pool may be configured through at least one of RRC information, SIB information or other higher layer signaling information or DCI, SCI information or other L1 signaling information. As such, the exceptional pool may be used when there is no resource that may be selected or reselected by the UE within the resource selection window.

Resource selection Method 3: The UE determines the resource selection window without considering sidelink DRX, and the corresponding period (slot) is defined as an active time of sidelink DRX, and the UE selects a resource only in the determined resource selection window area.

According to resource selection Method 3, setting the resource selection window as the active time of sidelink DRX may also be determined as allowing monitoring/decoding of control information ($1^{st}$ SCI) for sensing for resource selection as well as control information ($1^{st}$ SCI and $2^{nd}$ SCI) for data reception. The corresponding information may be additionally indicated for data transmission/reception between UEs in sidelink communication. In this case, various indication methods may be used. In general, an indication to match DRX wake-up times through SCI ($1^{st}$ SCI or $2^{nd}$ SCI) may be made. In contrast, in unicast, the corresponding indication may be made through PC5-RRC or sidelink MAC CE. However, the method for indication through SCI may advantageously be used in all of broadcast, groupcast, and unicast.

According to resource selection Method 3, the active time (or on-duration) DRX may be defined under the following conditions.

When a DRX cycle is set in sidelink communication, conditions for setting an active time (or on-duration) may include at least one of the following conditions.

Condition 1: When drx-onDurationTimer or drx-InactivityTimer or drx-RetransmissionTimer operates, or Condition 2: When resource selection window operates (when a resource selection window for resource selection is configured)

Setting a DRX cycle in sidelink communication in resource selection Method 3 may be interpreted as performing DRX in sidelink communication. The instance of when the resource selection window operates' may be interpreted as where the corresponding resource selection window is an occasion when the timer for DRX active time is running.

When periodic-based partial sensing is performed as shown in FIG. 8, Y ($\geq 1$) candidate slots may be selected in the resource selection window 801. In this case, the Y candidate slots may be continuously or non-contiguously selected in the time domain in the resource selection window. The minimum value of Y may be (pre-)configured. The final selection of the Y value and which slot is to be selected may be determined by the HE implementation. When Y($\geq 1$) candidate slots are selected in the resource selection window 801 when sidelink DRX is configured and operated, it needs to be selected in the slot corresponding to the active time of sidelink DRX.

Figure 15:
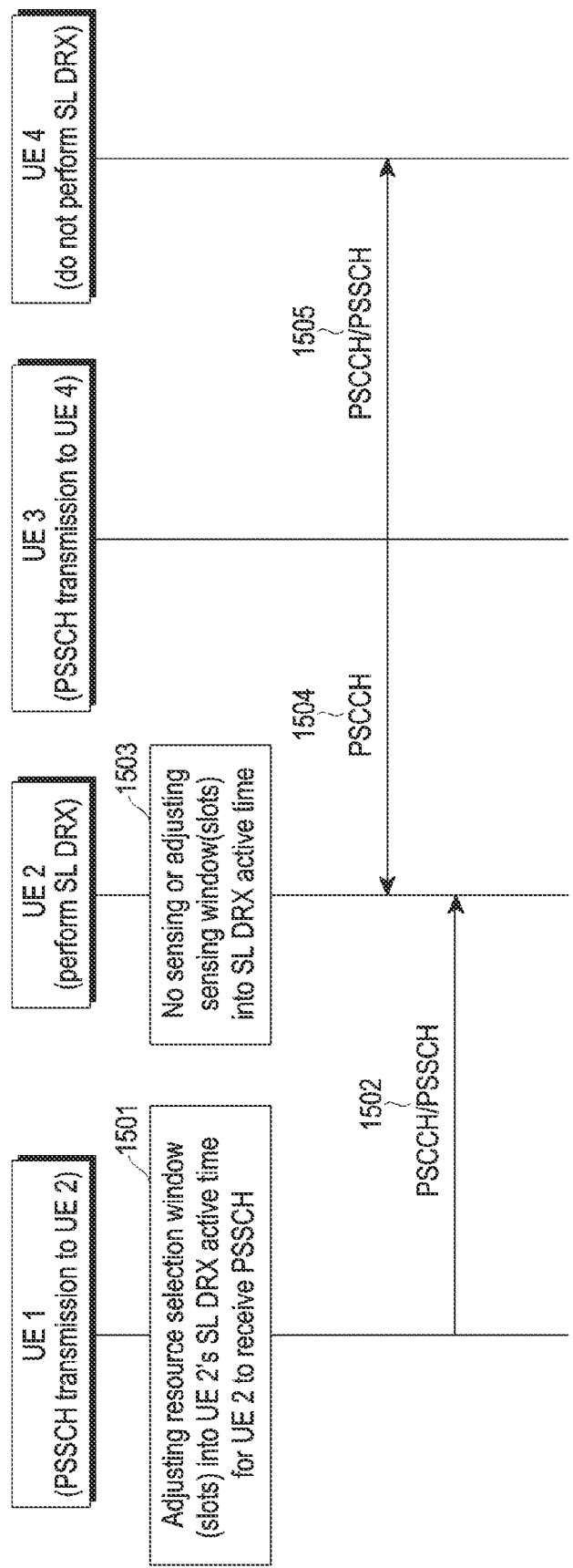
FIG. 15 illustrates a UE's operations for sensing and resource selection when DRX is performed in sidelink communication according to an embodiment.

FIG. 15 illustrates a UE's operations for sensing and resource selection when DRX is performed in sidelink communication according to an embodiment.

Specifically, FIG. 15 illustrates four UEs (UE1 to UE4) performing transmission/reception in a sidelink. FIG. 15 illustrates an example in which UE1 is a UE performing sidelink data transmission, i.e., PSSCH transmission, to UE2, and UE2 is a UE performing sidelink DRX. As described in connection with the fourth embodiment, if UE1 transmits sidelink data to UE2 in the period when UE2 operates in the DRX inactive time in sidelink communication, UE2 may not receive the sidelink data. Accordingly, in step 1501, the peer UE (UE1) transmitting sidelink data to the UE (UE2) performing DRX needs to determine(or adjust) a resource selection window to allow the Rx UE (UE2) to receive the transmitted data when performing Mode2 sensing to select a resource. UEs performing transmission/reception in the sidelink may be configured with whether DRX is configured and DRX-related parameters in various methods.

For example, when (pre-)configured or in the case of unicast, the corresponding information may be configured through PC5-RRC or MAC CE. In step 1502, UE1 may select a resource in the resource selection window determined in step 1501 and transmit sidelink data to UE2 through PSCCH/PSSCH. The fourth embodiment is referenced as details for FIG. 15.

Although the steps of the disclosure in connection with the fourth embodiment are shown in FIG. 15 focusing on the case of Mode2, even in the case of Mode1, if the base station allocates a resource to UE1, and the Rx UE, i.e., UE2, is performing DRX, the base station needs to grasp UE2's DRX state information and allocate a resource in UE2's DRX active time. To that end, the base station needs to know the UE's DRX state information (e.g., whether DRX is configured and DRX-related parameters). As described in connection with FIG. 4, in the case of Mode 1, the UE may additionally signal information that may help the base station to schedule, to the base station. This may be done by an RRC message or MAC CE.

Herein, the method for indicating the corresponding information is not limited thereto. The corresponding information may be referred to as UEAssistanceInformation. The base station may cell-commonly configure DRX state information, and the base station may assume the corresponding configuration. In contrast, when the base station cannot adjust the corresponding configuration (e.g., when the corresponding information is configured through PC5-RRC or MAC CE in the case of unicast), the UE may include DRX state information in the UEAssistanceInformation and indicate the information to the base station. In the case of Mode1, the base station needs to receive the UE's DRX configuration information and perform Mode1 scheduling, and the UE may accordingly expect the base station to perform Mode1 scheduling with DCI.

In FIG. 15, when UE2 is performing sidelink DRX, sensing may be impossible in the inactive time of sidelink DRX. As described in connection with the first to third embodiments, when the whole sensing period (slot) is the inactive time of DRX, UE2 may not perform a sensing step. Therefore, as in step 1503, UE2 does not perform sensing, or the sensing period (slot) needs to be determined/adjusted in the active time of DRX. When the sensing period (slot) is determined as the active time of DRX, UE2 may monitor the PSCCH ($1^{st}$ SCI) of another UE (UE3) in the sensing period as in step 1504. The first to third embodiments are referenced as details for these steps. FIG. 15 illustrates an example in which UE3 is a UE to perform sidelink data transmission, i.e., PSSCH transmission, to UE4, and UE4 is a UE not performing sidelink DRX. In this case, unlike in step 1501, UE3 man determine a resource selection window and select a resource without the need for considering the DRX of the Rx UE and transmit sidelink data to UE4 through PSCCH/PSSCH in step 1505.

Figure 16:
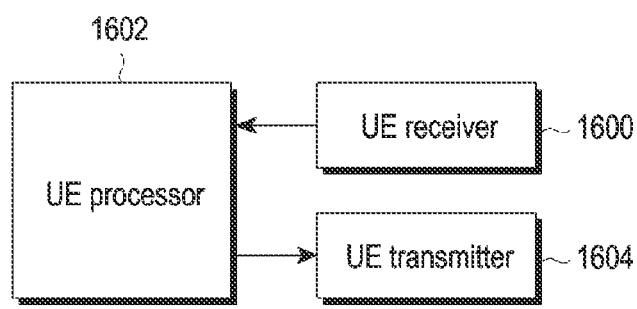
FIG. 16 illustrates an inner structure of a LE according to an embodiment.

FIG. 16 illustrates an internal structure of a UE according to an embodiment of the disclosure.

Referring to FIG. 16, a UE may include a UE receiver 1600, a UE transmitter 1604, and a UE processor 1602. The UE receiver 1600 and the UE transmitter 1604 may collectively be referred to as a transceiver. The UE processor 1602 may control a sensing operation and/or resource selection operation according to the above-described embodiments, and the UE processor 1602 may be referred to as a controller or processor. The UE processor 1602 may transmit/receive signals to/from the base station through the transceiver. The UE processor 1602 may transmit/receive signals to/from the counterpart UE in sidelink communication through the transceiver. The signals may include control information and data. To that end, the transceiver may include a radio frequency (RF) transmitter for frequency-up converting and amplifying signals transmitted and an RF receiver for low-noise amplifying signals received and frequency-down converting the frequency of the received signals. The transceiver may receive signals via a radio channel, output the signals to the UE processor 1602, and transmit signals output from the UE processor 1602 via a radio channel. The UE processor 1602 may control a series of processes for the UE to be able to operate according to the above-described embodiments.

Figure 17:
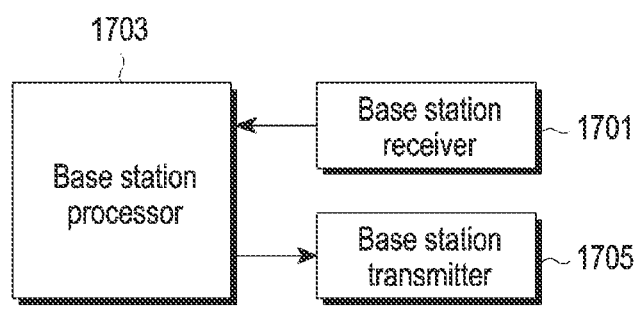
FIG. 17 illustrates an internal structure of a base station according to an embodiment.

FIG. 17 illustrates an inner structure of a base station according to an embodiment.

Referring to FIG. 17, a base station may include a base station receiver 1701, a base station transmitter 1705, and a base station processor 1703. The base station receiver 1701 and the base station transmitter 1705 may collectively be referred to as a transceiver. The base station processor 1703 may provide DRX-related configuration information to the UE and, when the above-described Mode 1 operation, in which the base station allocates a transmission resource in sidelink communication, is performed, schedule a sidelink resource considering the UE's DRX operation, and provide the scheduled resource allocation information to the UE. In this case, the UE may expect the base station to allocate a Mode 1 resource considering DRX. The base station processor 1703 may transmit/receive signals to/from the UE through the transceiver. The signals may include control information and data. To that end, the transceiver may include an RF transmitter for frequency-up converting and amplifying signals transmitted and an RF receiver for low-noise amplifying signals received and frequency-down converting the frequency of the received signals. The transceiver may receive signals via a radio channel, output the signals to the base station processor 1703, and transmit signals output from the base station processor 1703 via a radio channel. The base station processor 1703 may control a series of processes for the base station to be able to operate according to the above-described embodiments.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program is instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Each block may represent a module, segment, or part of a code including one or more executable instructions for executing a specified logical function(s). It should also be noted that in some replacement execution examples, the functions mentioned in the blocks may occur in different orders. For example, two blocks that are consecutively shown may be performed substantially simultaneously or in a reverse order depending on corresponding functions.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A method for transmitting sidelink data by a first user equipment (UE) in a wireless communication system supporting sidelink communication between the first UE and a second UE, the method comprising:
    identifying configuration information including information associated with discontinuous reception (DRX) for the sidelink communication; and
    in case that the second UE performs a DRX operation and there is no candidate resource in a DRX active time, additionally selecting, based on UE implementation, at least one resource to be used for transmitting the sidelink data to the second UE in the DRX active time, the DRX active time of the second UE being identified based on the configuration information.

2. The method of claim 1,
wherein identifying the configuration information comprises obtaining the configuration information through radio resource control (RRC) configuration using a PC5 interface for the sidelink communication between the first UE and the second UE.

3. The method of claim 1,
wherein the configuration information comprises information indicating whether the DRX for the sidelink communication is configured.

4. The method of claim 1, further comprising:
determining a resource selection window based on the DRX active time of the second UE; and
selecting a resource for transmission of the sidelink data using the resource selection window.

5. The method of claim 1,
wherein a resource for transmission of the sidelink data is selected within the DRX active time of the second UE in case that the second UE performs a DRX operation and there is a candidate resource in the DRX active time.

6. The method of claim 1, further comprising selecting a resource for transmission of the sidelink data by using a sensing scheme in which a UE directly selects a transmission resource for sidelink communication.

7. The method of claim 1, wherein the information associated with the DRX includes at least one of:
    information on a DRX cycle indicating a time period to which the DRX is applied,
    information on a DRX-on duration timer indicating a time duration of the active time in the DRX cycle, and
    information on a DRX-inactivity timer indicating an extended time duration of the active time when sidelink control information is detected before the DRX-on duration timer expires, and
    wherein the active time corresponds to a time period in which the DRX-on duration timer or the DRX-inactivity timer operates.

8. A first user equipment (UE) for transmitting sidelink data in a wireless communication system supporting sidelink communication between the first UE and a second UE, the first UE comprising:
    a transceiver; and
    a processor configured to:
        identify configuration information including information associated with discontinuous reception (DRX) for the sidelink communication, and
        in case that the second UE performs a DRX operation and there is no candidate resource in a DRX active time, additionally select, based on UE implementation, at least one resource to be used for transmitting, via the transceiver, the sidelink data to the second UE in a DRX active time, the DRX active time of the second UE being identified based on the configuration information.

9. The first UE of claim 8,
wherein the processor is further configured to obtain the configuration information through radio resource control (RRC) configuration using a PC5 interface for the sidelink communication between the first UE and the second UE.

10. The first UE of claim 8,
wherein the configuration information comprises information indicating whether the DRX for the sidelink communication is configured.

11. The first UE of claim 8,
wherein the processor is further configured to determine a resource selection window based on the DRX active time of the second UE, and to select a resource for transmission of the sidelink data using the resource selection window.

12. The first UE of claim 8,
wherein a resource for transmission of the sidelink data is selected within the DRX active time of the second UE in case that the second UE performs a DRX operation and there is a candidate resource in the DRX active time.

13. The first UE of claim 8,
wherein the processor is further configured to select a resource for transmission of the sidelink data by using a sensing scheme in which a UE directly selects a transmission resource for sidelink communication.

14. The first UE of claim 8, wherein the information associated with the DRX includes at least one of:
    information on a DRX cycle indicating a time period to which the DRX is applied,
    information on a DRX-on duration timer indicating a time duration of the active time in the DRX cycle, and
    information on a DRX-inactivity timer indicating an extended time duration of the active time when sidelink control information is detected before the DRX-on duration timer expires, and wherein the active time corresponds to a time period in which the DRX-on duration timer or the DRX-inactivity timer operates.

\* \* \* \* \*